US010690227B2

(12) United States Patent
Hofmann et al.

(10) Patent No.: US 10,690,227 B2
(45) Date of Patent: Jun. 23, 2020

(54) SYSTEMS AND METHODS FOR IMPLEMENTING TAILORED METALLIC GLASS-BASED STRAIN WAVE GEARS AND STRAIN WAVE GEAR COMPONENTS

(71) Applicant: California Institute of Technology, Pasadena, CA (US)

(72) Inventors: Douglas C. Hofmann, Altadena, CA (US); Brian H. Wilcox, La Canada, CA (US)

(73) Assignee: California Institute of Technology, Pasadena, CA (US)

(*) Notice: Subject to any disclaimer, the term of this patent is extended or adjusted under 35 U.S.C. 154(b) by 3 days.

(21) Appl. No.: 16/214,848

(22) Filed: Dec. 10, 2018

(65) Prior Publication Data

US 2019/0170235 A1 Jun. 6, 2019

Related U.S. Application Data

(62) Division of application No. 15/062,902, filed on Mar. 7, 2016, now Pat. No. 10,151,377.
(Continued)

(51) Int. Cl.
*F16H 49/00* (2006.01)
*C22C 45/10* (2006.01)
*B22D 19/00* (2006.01)

(52) U.S. Cl.
CPC ....... *F16H 49/001* (2013.01); *B22D 19/0036* (2013.01); *C22C 45/10* (2013.01);
(Continued)

(58) Field of Classification Search
CPC .......... Y10T 29/49462; Y10T 29/49467; Y10T 29/49478; Y10T 29/4948; F16H 55/0833; F16H 49/001
See application file for complete search history.

(56) References Cited

U.S. PATENT DOCUMENTS 3,435,512 A    4/1969   MacRobbie
3,529,457 A    9/1970   Bowers
(Continued)

FOREIGN PATENT DOCUMENTS

CN    101709773 A    5/2010
CN    102563006 A    7/2012
(Continued)

OTHER PUBLICATIONS

Extended European Search Report for European Application No. 14889035.3, Search completed Dec. 4, 2017, dated Dec. 13, 2017, 10 Pgs.
(Continued)

*Primary Examiner* — Jason L Vaughan
(74) *Attorney, Agent, or Firm* — KPPB LLP

(57) ABSTRACT

Systems and methods in accordance with embodiments of the invention implement tailored metallic glass-based strain wave gears and strain wave gear components. In one embodiment, a method of fabricating a flexspline of a strain wave gear includes: forming a MG-based composition into a flexspline using one of a thermoplastic forming technique and a casting technique; where the forming of the MG-based composition results in a formed MG-based material; where the formed flexspline is characterized by: a minimum thickness of greater than approximately 1 mm and a major diameter of less than approximately 4 inches.

28 Claims, 28 Drawing Sheets

Related U.S. Application Data

(60) Provisional application No. 62/128,827, filed on Mar. 5, 2015.

(52) U.S. Cl.
CPC ..... *F16H 2049/003* (2013.01); *Y10T 29/4948* (2015.01); *Y10T 29/49462* (2015.01)

(56) References Cited

U.S. PATENT DOCUMENTS

| | | | |
|---|---|---|---|
| 3,682,606 A | 8/1972 | Anderson et al. | |
| 3,986,412 A | 10/1976 | Farley et al. | |
| 4,123,737 A | 10/1978 | Hoagland, Jr. | |
| RE29,989 E | 5/1979 | Polk | |
| 4,173,393 A | 11/1979 | Maurer | |
| 4,202,404 A | 5/1980 | Carlson | |
| 4,711,795 A | 12/1987 | Takeuchi et al. | |
| 4,749,625 A | 6/1988 | Obayashi et al. | |
| 4,810,314 A | 3/1989 | Henderson et al. | |
| 4,812,150 A | 3/1989 | Scott | |
| 4,823,638 A | 4/1989 | Ishikawa | |
| 4,851,296 A | 7/1989 | Tenhover et al. | |
| 4,883,632 A | 11/1989 | Goto et al. | |
| 4,935,291 A | 6/1990 | Gunnink | |
| 5,168,918 A | 12/1992 | Okuda et al. | |
| 5,288,344 A | 2/1994 | Peker et al. | |
| 5,310,432 A | 5/1994 | Yamanaka et al. | |
| 5,485,761 A * | 1/1996 | Rouverol | F16H 55/08 29/893.3 |
| 5,509,978 A | 4/1996 | Masumoto et al. | |
| 5,636,550 A * | 6/1997 | Deane | F16H 55/18 74/409 |
| 5,722,295 A * | 3/1998 | Sakai | F16H 55/06 264/101 |
| 5,746,844 A | 5/1998 | Sterett et al. | |
| 5,772,803 A | 6/1998 | Peker et al. | |
| 5,866,272 A | 2/1999 | Westre et al. | |
| 5,896,642 A | 4/1999 | Peker et al. | |
| 5,985,204 A | 11/1999 | Otsuka et al. | |
| 6,162,130 A | 12/2000 | Masumoto et al. | |
| 6,273,322 B1 | 8/2001 | Yamamoto et al. | |
| 6,620,264 B2 | 9/2003 | Kundig et al. | |
| 6,652,679 B1 | 11/2003 | Inoue et al. | |
| 6,771,490 B2 | 8/2004 | Peker et al. | |
| 6,843,496 B2 | 1/2005 | Peker et al. | |
| 6,887,586 B2 | 5/2005 | Peker et al. | |
| 7,052,561 B2 | 5/2006 | Lu et al. | |
| 7,073,560 B2 | 7/2006 | Kang et al. | |
| 7,075,209 B2 | 7/2006 | Howell et al. | |
| 7,357,731 B2 | 4/2008 | Johnson et al. | |
| 7,360,419 B2 | 4/2008 | French et al. | |
| 7,497,981 B2 | 3/2009 | Graham et al. | |
| 7,500,987 B2 | 3/2009 | Bassler et al. | |
| 7,552,664 B2 | 6/2009 | Bulatowicz | |
| 7,862,323 B2 | 1/2011 | Micarelli et al. | |
| 7,883,592 B2 * | 2/2011 | Hofmann | C22C 1/002 148/561 |
| 7,896,982 B2 | 3/2011 | Johnson et al. | |
| 7,955,713 B2 | 6/2011 | Roebroeks et al. | |
| 8,042,770 B2 | 10/2011 | Martin et al. | |
| 8,400,721 B2 | 3/2013 | Bertele et al. | |
| 8,418,366 B2 * | 4/2013 | Wang | B22D 27/15 164/132 |
| 8,485,245 B1 | 7/2013 | Prest et al. | |
| 8,596,106 B2 | 12/2013 | Tang et al. | |
| 8,613,815 B2 | 12/2013 | Johnson et al. | |
| 8,639,484 B2 | 1/2014 | Wei et al. | |
| 8,789,629 B2 | 7/2014 | Parness et al. | |
| 8,986,469 B2 | 3/2015 | Khalifa et al. | |
| 9,057,120 B2 | 6/2015 | Pham et al. | |
| 9,211,564 B2 | 12/2015 | Hofmann | |
| 9,328,813 B2 | 5/2016 | Hofmann et al. | |
| 9,610,650 B2 | 4/2017 | Hofmann et al. | |
| 9,783,877 B2 | 10/2017 | Hofmann et al. | |
| 9,791,032 B2 | 10/2017 | Hofmann et al. | |
| 9,868,150 B2 * | 1/2018 | Hofmann | B22D 18/04 |
| 10,081,136 B2 | 9/2018 | Hofmann et al. | |
| 10,151,377 B2 | 12/2018 | Hofmann et al. | |
| 10,155,412 B2 | 12/2018 | Parness et al. | |
| 10,174,780 B2 | 1/2019 | Hofmann et al. | |
| 10,487,934 B2 | 11/2019 | Kennett et al. | |
| 2002/0053375 A1 | 5/2002 | Hays et al. | |
| 2002/0100573 A1 | 8/2002 | Inoue et al. | |
| 2002/0184766 A1 | 12/2002 | Kobayashi et al. | |
| 2003/0052105 A1 | 3/2003 | Nagano et al. | |
| 2003/0062811 A1 | 4/2003 | Peker et al. | |
| 2004/0035502 A1 | 2/2004 | Kang et al. | |
| 2004/0103536 A1 | 6/2004 | Kobayashi et al. | |
| 2004/0103537 A1 | 6/2004 | Kobayashi et al. | |
| 2004/0154701 A1 | 8/2004 | Lu et al. | |
| 2005/0034792 A1 | 2/2005 | Lu et al. | |
| 2005/0127139 A1 | 6/2005 | Slattery et al. | |
| 2005/0263932 A1 | 12/2005 | Heugel | |
| 2006/0105011 A1 | 5/2006 | Sun et al. | |
| 2006/0130944 A1 | 6/2006 | Poon et al. | |
| 2006/0156785 A1 | 7/2006 | Mankame et al. | |
| 2007/0034304 A1 | 2/2007 | Inoue et al. | |
| 2007/0226979 A1 | 10/2007 | Paton et al. | |
| 2007/0228592 A1 | 10/2007 | Dunn et al. | |
| 2007/0253856 A1 | 11/2007 | Vecchio et al. | |
| 2008/0085368 A1 | 4/2008 | Gauthier et al. | |
| 2008/0121316 A1 | 5/2008 | Duan et al. | |
| 2009/0011846 A1 | 1/2009 | Scott | |
| 2009/0114317 A1 | 5/2009 | Collier et al. | |
| 2009/0194205 A1 | 8/2009 | Loffler et al. | |
| 2009/0277540 A1 | 11/2009 | Langlet | |
| 2009/0288741 A1 | 11/2009 | Zhang et al. | |
| 2010/0313704 A1 | 12/2010 | Wang et al. | |
| 2011/0048587 A1 | 3/2011 | Vecchio et al. | |
| 2011/0154928 A1 | 6/2011 | Ishikawa | |
| 2011/0302783 A1 | 12/2011 | Nagata et al. | |
| 2012/0067100 A1 | 3/2012 | Stefansson et al. | |
| 2012/0073710 A1 | 3/2012 | Kim et al. | |
| 2012/0077052 A1 | 3/2012 | Demetriou et al. | |
| 2012/0133080 A1 | 5/2012 | Moussa et al. | |
| 2012/0289946 A1 | 11/2012 | Steger | |
| 2013/0009338 A1 | 1/2013 | Mayer | |
| 2013/0048152 A1 | 2/2013 | Na et al. | |
| 2013/0062134 A1 | 3/2013 | Parness et al. | |
| 2013/0112321 A1 | 5/2013 | Poole et al. | |
| 2013/0133787 A1 | 5/2013 | Kim | |
| 2013/0139964 A1 | 6/2013 | Hofmann et al. | |
| 2013/0143060 A1 | 6/2013 | Jacobsen et al. | |
| 2013/0280547 A1 | 10/2013 | Brandl et al. | |
| 2013/0309121 A1 | 11/2013 | Prest et al. | |
| 2013/0333814 A1 | 12/2013 | Fleury et al. | |
| 2014/0004352 A1 | 1/2014 | McCrea et al. | |
| 2014/0020794 A1 | 1/2014 | Hofmann et al. | |
| 2014/0030948 A1 | 1/2014 | Kim et al. | |
| 2014/0045680 A1 | 2/2014 | Nakayama et al. | |
| 2014/0048969 A1 | 2/2014 | Swanson et al. | |
| 2014/0070445 A1 | 3/2014 | Mayer | |
| 2014/0083640 A1 | 3/2014 | Waniuk et al. | |
| 2014/0093674 A1 | 4/2014 | Hofmann et al. | |
| 2014/0141164 A1 | 5/2014 | Hofmann | |
| 2014/0202595 A1 | 7/2014 | Hofmann | |
| 2014/0213384 A1 | 7/2014 | Johnson et al. | |
| 2014/0224050 A1 * | 8/2014 | Hofmann | F16H 49/001 74/412 R |
| 2014/0227125 A1 | 8/2014 | Hofmann | |
| 2014/0246809 A1 | 9/2014 | Hofmann | |
| 2014/0293384 A1 | 10/2014 | O'keeffe et al. | |
| 2014/0312098 A1 | 10/2014 | Hofmann et al. | |
| 2014/0342179 A1 | 11/2014 | Hofmann et al. | |
| 2014/0348571 A1 | 11/2014 | Prest et al. | |
| 2015/0014885 A1 | 1/2015 | Hofmann et al. | |
| 2015/0047463 A1 | 2/2015 | Hofmann et al. | |
| 2015/0068648 A1 | 3/2015 | Schroers et al. | |
| 2015/0075744 A1 | 3/2015 | Hofmann et al. | |
| 2015/0289605 A1 | 10/2015 | Prest et al. | |
| 2015/0298443 A1 | 10/2015 | Hundley et al. | |
| 2015/0314566 A1 | 11/2015 | Mattlin et al. | |
| 2015/0323053 A1 | 11/2015 | El-Wardany et al. | |

(56) References Cited

U.S. PATENT DOCUMENTS

| | | | |
|---|---|---|---|
| 2016/0178047 A1 | 6/2016 | Kennett et al. | |
| 2016/0186850 A1 | 6/2016 | Hofmann et al. | |
| 2016/0258522 A1* | 9/2016 | Hofmann | F16H 49/001 |
| 2016/0263937 A1 | 9/2016 | Parness et al. | |
| 2016/0265576 A1 | 9/2016 | Hofmann et al. | |
| 2016/0299183 A1 | 11/2016 | Lee | |
| 2016/0361897 A1 | 12/2016 | Hofmann et al. | |
| 2017/0121799 A1 | 5/2017 | Hofmann et al. | |
| 2017/0137955 A1 | 5/2017 | Hofmann et al. | |
| 2017/0226619 A1 | 8/2017 | Hofmann et al. | |
| 2018/0119259 A1 | 5/2018 | Hofmann et al. | |
| 2018/0257141 A1 | 9/2018 | Hofmann et al. | |
| 2018/0339338 A1 | 11/2018 | Hofmann et al. | |
| 2018/0339342 A1 | 11/2018 | Hofmann | |
| 2019/0126674 A1 | 5/2019 | Parness et al. | |
| 2019/0154130 A1 | 5/2019 | Hofmann et al. | |

FOREIGN PATENT DOCUMENTS

| | | | |
|---|---|---|---|
| CN | 103153502 A | 6/2013 | |
| DE | 102010062089 A1 | 5/2012 | |
| DE | 112018001284 T5 | 11/2019 | |
| EP | 0127366 A1 | 5/1984 | |
| EP | 1063312 A1 | 12/2000 | |
| EP | 1138798 A1 | 10/2001 | |
| EP | 1696153 A1 | 8/2006 | |
| EP | 1404884 B1 | 7/2007 | |
| EP | 1944138 A2 | 7/2008 | |
| JP | 61276762 A | 12/1986 | |
| JP | 09121094 A | 5/1997 | |
| JP | 2002045960 A | 2/2002 | |
| JP | 2004353053 A | 12/2004 | |
| JP | 2007040517 A | 2/2007 | |
| JP | 2007040518 A | 2/2007 | |
| JP | 2007247037 A | 9/2007 | |
| JP | 2008115932 A | 5/2008 | |
| JP | 2008264865 A | 11/2008 | |
| JP | 2011045931 A | 3/2011 | |
| JP | 2012046826 A | 3/2012 | |
| JP | 2012162805 A | 8/2012 | |
| JP | 2013057397 A | 3/2013 | |
| JP | 5249932 B2 | 7/2013 | |
| JP | 2013238278 A | 11/2013 | |
| KR | 101420176 B1 | 7/2014 | |
| WO | 2007038882 A1 | 4/2007 | |
| WO | 2008156889 A2 | 12/2008 | |
| WO | 2011159596 A1 | 12/2011 | |
| WO | 2012031022 A2 | 3/2012 | |
| WO | 2012083922 A1 | 6/2012 | |
| WO | 2012147559 A1 | 11/2012 | |
| WO | 2013138710 A1 | 9/2013 | |
| WO | 2013141878 A1 | 9/2013 | |
| WO | 2013141882 A1 | 9/2013 | |
| WO | 2014004704 A1 | 1/2014 | |
| WO | 2014012113 A2 | 1/2014 | |
| WO | 2014058498 A3 | 4/2014 | |
| WO | 2015042437 A1 | 3/2015 | |
| WO | 2015156797 A1 | 10/2015 | |
| WO | 2016116562 A1 | 7/2016 | |
| WO | 2018165662 A1 | 9/2018 | |
| WO | 2018218077 A1 | 11/2018 | |

OTHER PUBLICATIONS

International Preliminary Report on Patentability for International Application PCT/US2013/047950, issued Dec. 31, 2014, dated Jan. 8, 2015, 7 Pgs.
International Preliminary Report on Patentability for International Application PCT/US2013/050614, issued Jan. 20, 2015, dated Jan. 29, 2015, 9 Pgs.
International Preliminary Report on Patentability for International Application PCT/US2014/033510, issued Oct. 12, 2016, dated Oct. 20, 2016, 9 Pgs.
International Preliminary Report on Patentability for International Application PCT/US2014/056615, issued Mar. 22, 2016, dated Mar. 31, 2016, 11 Pgs.
International Search Report and Written Opinion for International Application No. PCT/US2013/050614, Completed May 7, 2014, dated May 7, 2014, 12 pgs.
International Search Report and Written Opinion for International Application No. PCT/US2018/022020, Search completed Jul. 2, 2018, dated Jul. 3, 2018, 12 Pgs.
International Search Report and Written Opinion for International Application No. PCT/US2018/034481, Search completed Sep. 10, 2018, dated Sep. 10, 2018, 19 Pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wkipedia. https://en.wikipedia.org/wiki/Group_4_element. Published Jun. 11, 2010. Accessed Aug. 24, 2016.
Hofmann, D. C. "Development of tough, low-density titanium-based bulk metallic glass matrix composites with tensile ductility", PNAS, Dec. 23, 2008, vol. 105, pp. 20136-20140.
Hofmann et al., "Designing metallic glass matrix composites with high toughness and tensile ductility", Nature Letters, Feb. 28, 2008, vol. 451, pp. 1085-1090.
Hofmann et al., "Improving Ductility in Nanostructured Materials and Metallic Glasses: Three Laws", Material Science Forum, vol. 633-634, 2010, pp. 657-663, published online Nov. 19, 2009.
Hofmann et al., "Semi-solid Induction Forging of Metallic Glass Matrix Composites", JOM, Dec. 2009, vol. 61, No. 12, pp. 11-17, plus cover.
Hong et al., "Microstructural characteristics of high-velocity oxygen-fuel (HVOF) sprayed nickel-based alloy coating", Journal of Alloys and Compounds, Jul. 26, 2013, vol. 581, pp. 398-403.
Hu et al., "Crystallization Kinetics of the $Cu_{47.5}Zr_{74.5}Al_5$ Bulk Metallic Glass under Continuous and Iso-thermal heating", App. Mech. and Materials, vols. 99-100, Sep. 8, 2011, p. 1052-1058.
Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97.
Huang et al., "Fretting wear behavior of bulk amorphous steel", Intermetallics, Jun. 12, 2011, vol. 19, pp. 1385-1389.
Inoue et al., "Cobalt-based bulk glassy alloy with ultrahigh strength and soft magnetic properties", Nature Materials, Sep. 21, 2003, vol. 2, pp. 661-663.
Inoue et al., "Development and applications of late transition metal bulk metallic glasses", Bulk Metallic Glasses, pp. 1-25, 2008.
Inoue et al., "Developments and applications of bulk metallic glasses", Reviews on Advanced Materials Science, Feb. 28, 2008, vol. 18, pp. 1-9.
Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.
Inoue et al., "Recent development and application products of bulk glassy alloys", Acta Materialia, Jan. 20, 2011, vol. 59, Issue 6, pp. 2243-2267.
Ishida et al., "Wear resistivity of super-precision microgear made of Ni—based metallic glass", Materials Science and Engineering, Mar. 25, 2007, vol. A449-451, pp. 149-154.
Jiang et al., "Low-Density High-Strength Bulk Metallic Glasses and Their Composites: A Review", Advanced Engineering Materials, Nov. 19, 2014, pp. 1-20, DOI: 10.1002/adem.201400252.

(56) References Cited

OTHER PUBLICATIONS

Jiang et al., "Tribological Studies of a Zr—Based Glass-Forming Alloy with Different States", Advanced Engineering Materials, Sep. 14, 2009, vol. 1, No. 11, pp. 925-931.
Johnson et al., "Quantifying the Origin of Metallic Glass Formation", Nature Communications, Jan. 20, 2016, vol. 7, 10313, 7 pgs., doi: 10.1038/ncomms10313.
Jung et al., "Fabrication of Fe—based bulk metallic glass by selective laser melting: A parameter study", Materials and Design, Jul. 30, 2015, vol. 86, pp. 703-708.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim, Junghwan et al. "Oxidation and crystallization mechanisms in plasma-sprayed Cu—based bulk metallic glass coatings", Acta Materialia., Feb. 1, 2010, vol. 58, pp. 952-962.
Kim et al., "Amorphous phase formation of Zr—based alloy coating by HVOF spraying process", Journal of Materials Science, Jan. 1, 2001, vol. 36, pp. 49-54.
Kim et al., "Design and synthesis of Cu—based metallic glass alloys with high glass forming ability", Journal of Metastable and Nanocrystalline Materials, Sep. 1, 2005, vols. 24-25, pp. 93-96.
Kim et al., "Enhancement of metallic glass properties of Cu—based BMG coating by shroud plasma spraying", Science Direct, Surface & Coatings Technology, Jan. 25, 2011, vol. 205, pp. 3020-3026, Nov. 6, 2010.
Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.
Kim et al., "Realization of high tensile ductility in a bulk metallic glass composite by the utilization of deformation-induced martensitic transformation", Scripta Materialia, May 3, 2011, vol. 65, pp. 304-307.
Kim et al., "Weldability of $Cu_{54}Zr_{22}Ti_{18}N_{i6}$ bulk metallic glass by ultrasonic welding processing", Materials Letters, May 17, 2014, 130, pp. 160-163.
Kobayashi et al., "Fe—based metallic glass coatings produced by smart plasma spraying process", Materials Science and Engineering, Feb. 25, 2008, vol. B148, pp. 110-113.
Kobayashi et al., "Mechanical property of Fe—base metallic glass coating formed by gas tunnel type plasma spraying", ScienceDirect, Surface & Coatings Technology, Mar. 14, 2008, 6 pgs.
Kobayashi et al., "Property of Ni—Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.
Kong et al., "Effect of Flash Temperature on Tribological Properties of Bulk Metallic Glasses", Tribol. Lett., Apr. 25, 2009, vol. 35, pp. 151-158.
Kozachkov et al., "Effect of cooling rate on the volume fraction of B2 phases in a CuZrAlCo metallic glass matrix composite", Intermetallics, Apr. 19, 2013, vol. 39, pp. 89-93.
Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326.
Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.
Kumar et al., "Bulk Metallic Glass: The Smaller the Better", Advanced Materials, Jan. 25, 2011, vol. 23, pp. 461-476.
Kwon et al., "Wear behavior of Fe—based bulk metallic glass composites", Journal of Alloys and Compounds, Jul. 14, 2011, vol. 509S, pp. S105-S108.
Launey et al., "Fracture toughness and crack-resistance curve behavior in metallic glass-matrix composites", Applied Physics Letters, Jun. 18, 2009, vol. 94, pp. 241910-1-241910-3.
Launey et al., "Solution to the problem of the poor cyclic fatigue resistance of bulk metallic glasses", PNAS Early Edition, pp. 1-6, Jan. 22, 2009,.
Lee et al., "Effect of a controlled volume fraction of dendritic phases on tensile and compressive ductility in La—based metallic glass matrix composites", Acta Materialia, vol. 52, Issue 14, Jun. 17, 2004, pp. 4121-4131.
Lee et al., "Nanomechanical properties of embedded dendrite phase and its influence on inelastic deformation of Zr55Al10Ni5Cu30 glassy alloy", Materials Science and Engineering A, Mar. 25, 2007, vol. 375, pp. 945-948.
Li et al., "Selective laser melting of Zr—based bulk metallic glasses: Processing, microstructure and mechanical properties", Materials and Design, Sep. 21, 2016, vol. 112, pp. 217-226.
Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.
Lillo et al., "Microstructure, Processing, Performance Relationships for High Temperature Coatings", U.S. Department of Energy, Office of Fossil Energy, under DOE Idaho Operations Office, Contract DE-AC07-05ID14517; 22nd Annual Conference on Fossil Energy Materials, Pittsburgh, U.S., 8 pgs., Jul. 1, 2008.
Lin et al., "Designing a toxic-element-free Ti—based amorphous alloy with remarkable supercooled liquid region for biomedical application", Intermetallics, Jul. 9, 2014, vol. 55, pp. 22-27.
List, A. et al. "Impact Conditions for Cold Spraying of Hard Metallic Glasses", Journal of Thermal Spray Technology, Jun. 1, 2012, vol. 21, No. 3-4, pp. 531-540.
Liu, X. Q. "Microstructure and properties of Fe—based amorphous metallic coating produced by high velocity axial plasma spraying", Science Direct, Journal of Alloys and Compounds, Apr. 23, 2009, vol. 484, pp. 300-307.
Liu et al., "Influence of Heat Treatment on Microstructure and Sliding Wear of Thermally Sprayed Fe—Based Metallic Glass coatings", Tribol. Lett., Mar. 4, 2012, vol. 46, pp. 131-138.
Liu et al., "Metallic glass coating on metals plate by adjusted explosive welding technique", Applied Surface Science, Jul. 16, 2009, vol. 255, pp. 9343-9347.
Liu et al., "Sliding Tribological Characteristics of a Zr—based Bulk Metallic Glass Near the Glass Transition Temperature", Tribol. Lett., Jan. 29, 2009, vol. 33, pp. 205-210.
Liu et al., "Wear behavior of a Zr—based bulk metallic glass and its composites", Journal of Alloys and Compounds, May 5, 2010, vol. 503, pp. 138-144.
Lupoi, R. et al. "Deposition of metallic coatings on polymer surfaces using cold spray", Science Direct, Surface & Coatings Technology, Sep. 6, 2010, vol. 205, pp. 2167-2173.
Ma et al., "Wear resistance of Zr—based bulk metallic glass applied in bearing rollers", Materials Science and Engineering, May 4, 2004, vol. A386, pp. 326-330.
Maddala et al., "Effect of notch toughness and hardness on sliding wear of $Cu_{50}Hf_{41.5}A_{18.5}$ bulk metallic glass", Scripta Materialia, Jul. 6, 2011, vol. 65, pp. 630-633.
International Preliminary Report on Patentability for International Application PCT/US2018/022020, issued Sep. 10, 2019, dated Sep. 19, 2019, 10 pgs.
Madge, "Toughness of Bulk Metallic Glasses, Metals", vol. 5, Issue 3, pp. 1127-1769, ISSN 2075-4701, Jul. 17, 2015 See p. 1287.
Mahbooba et al., "Additive manufacturing of an iron-based bulk metallic glass larger than the critical casting thickness", Applied Materials Today, Feb. 27, 2018, vol. 11, pp. 264-269.
Narayan et al., "On the hardness and elastic modulus of bulk metallic glass matrix composites", Scripta Materialia, Jun. 9, 2010, vol. 63, Issue 7, pp. 768-771.
Ni et al., "High performance amorphous steel coating prepared by HVOF thermal spraying", Journal of Alloys and Compounds, Jan. 7, 2009, vol. 467, pp. 163-167, Nov. 29, 2007.
Nishiyama et al., "Recent progress of bulk metallic glasses for strain-sensing devices", Materials Science and Engineering: A, Mar. 25, 2007, vols. 449-451, pp. 79-83.
Oh et al., "Microstructure and tensile properties of high-strength high-ductility Ti—based amorphous matrix composites containing ductile dendrites", Acta Materialia, Sep. 23, 2011, vol. 59, Issue 19, pp. 7277-7286.

(56) References Cited

OTHER PUBLICATIONS

Parlar et al., "Sliding tribological characteristics of Zr—based bulk metallic glass", Intermetallics, Jan. 2008, vol. 16, pp. 34-41.
Pauly et al., "Modeling deformation behavior of Cu—Zr—Al bulk metallic glass matrix composites", Applied Physics Letters, Sep. 2009, vol. 95, pp. 101906-1-101906-3.
Pauly et al., "Processing Metallic Glasses by Selective Laser Melting", Materials Today, Jan./Feb. 2013, vol. 16, pp. 37-41.
Pauly et al., "Transformation-mediated ductility in CuZr-based bulk metallic glasses", Nature Materials, May 16, 2010, vol. 9, Issue 6, pp. 473-477.
Ponnambalam et al., "Fe—based bulk metallic glasses with diameter thickness larger than one centimeter", J Mater Res, Feb. 17, 2004. vol. 19; pp. 1320-1323.
Porter et al., "Incorporation of Amorphous Metals into MEMS for High Performance and Reliability", Rockwell Scientific Company, Final Report, Nov. 1, 2003, 41 pgs.
Prakash et al., "Sliding wear behavior of some Fe—, Co—and Ni—based metallic glasses during rubbing against bearing steel", Tribology Letters, May 1, 2000, vol. 8, pp. 153-160.
Qiao et al., "Development of plastic Ti—based bulk-metallic-glass-matrix composites by controlling the microstructures", Materials Science and Engineering: A, Aug. 20, 2010, vol. 527, Issues 29-30, pp. 7752-7756.
Ramamurty et al., "Hardness and plastic deformation in a bulk metallic glass", Acta Materialia, Feb. 2005, vol. 53, pp. 705-717.
Revesz et al., "Microstructure and morphology of Cu—Zr—Ti coatings produced by thermal spray and treated by surface mechanical attrition", ScienceDirect, Journal of Alloys and Compounds, Jul. 14, 2011, vol. 509S, pp. S482-S485, Nov. 4, 2010.
Rigney et al., "The Evolution of Tribomaterial During Sliding: A Brief Introduction", Tribol. Lett, Jul. 1, 2010, vol. 39, pp. 3-7.
Roberts et al., "Cryogenic Charpy impact testing of metallic glass matrix composites", Scripta Materialia, Nov. 11, 2011, 4 pgs.
Sanders et al., "Stability of Al—rich glasses in the Al—La—Ni system", 2006, Intermetallics, 14, pp. 348-351.
Schuh et al., "A survey of instrumented indentation studies on metallic glasses", J. Mater. Res., Jan. 2004, vol. 19, No. 1, pp. 46-57.
Segu et al., "Dry Sliding Tribological Properties of Fe—Based Bulk Metallic Glass", Tribol. Lett., Apr. 28, 2012, vol. 47, pp. 131-138.
Shen et al., "3D printing of large, complex metallic glass structures", Materials and Design, Mar. 2017, vol. 117, pp. 213-222.
Shen et al., "Exceptionally high glass-forming ability of an FeCoCrMoCBY alloy", Applied Physics, Apr. 5, 2005, vol. 86, pp. 151907-1-151907-3.
Singer et al., "Wear behavior of triode-sputtered MoS2 coatings in dry sliding contact with steel and ceramics", Wear, Jul. 1996, vol. 195, Issues 1-2, pp. 7-20.
Sinmazcelik et al., "A review: Fibre metal laminates, background, bonding types and applied test methods", Materials and Design, vol. 32, Issue 7, 3671, Mar. 4, 2011, pp. 3671-3685.
Song et al., "Strategy for pinpointing the formation of B2 CuZr in metastable CuZr-based shape memory alloys", Acta Materialia, Aug. 6, 2011, vol. 59, pp. 6620-6630.
Sun et al., "Fiber metallic glass laminates", Dec. 2010, J. Mater. Res., vol. 25, No. 12, pp. 2287-2291.
Sundaram et al., "Mesoscale Folding, Instability, and Disruption of Laminar Flow in Metal Surfaces", Physical Review Letters, Sep. 7, 2012, vol. 109, pp. 106001-1-106001-5.
Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.
Tam et al., "Abrasion resistance of Cu based bulk metallic glasses", Journal of Non-Crystalline Solids, Oct. 18, 2004, vol. 347, pp. 268-272.
Tam et al., "Abrasive wear of $Cu_{60}Zr_{30}Ti_{10}$ bulk metallic glass", Materials Science and Engineering, Apr. 1, 2004, vol. A384 pp. 138-142.
Tan et al., "Synthesis of La—based in-situ bulk metallic glass matrix composite", Intermetallics, Nov. 2002, vol. 10, Issues 11-12, pp. 1203-1205.
Tao et al., "Effect of rotational sliding velocity on surface friction and wear behavior in Zr—based bulk metallic glass", Journal of Alloys and Compounds, Mar. 4, 2010, vol. 492, pp. L36-L39.
Tao et al., "Influence of isothermal annealing on the micro-hardness and friction property in CuZrAl bulk metallic glass", Advanced Materials Research, Jan. 1, 2011, vols. 146-147, pp. 615-618.
Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.
Wagner, "Mechanical Behavior of 18 Ni 200 Grade Maraging Steel at Cyrogenic Temperatures", J Aircraft, Nov. 1, 1986, vol. 23, No. 10, pp. 744-749.
Wang et al., "Progress in studying the fatigue behavior of Zr—based bulk-metallic glasses and their composites", Intermetallics, Mar. 6, 2009, vol. 17, pp. 579-590.
Whang et al., "Microstructures and age hardening of rapidly quenched Ti—Zr—Si alloys", Journal of Materials Science Letters,1985, vol. 4, pp. 883-887.
Wikipedia, "Harmonic Drive", printed Feb. 20, 2014, 4 pgs.
Wu et al., "Bulk Metallic Glass Composites with Transformation-Mediated Work-Hardening and Ductility", Adv. Mater., Apr. 26, 2010, vol. 22, pp. 2770-2773.
Wu et al., "Dry Sliding tribological behavior of Zr—based bulk metallic glass", Transactions of Nonferrous Metals Society of China, Jan. 16, 2012, vol. 22, Issue 3, pp. 585-589.
Wu et al., "Effects of environment on the sliding tribological behaviors of Zr—based bulk metallic glass", Intermetallics, Jan. 27, 2012, vol. 25, 115-125.
Wu et al., "Formation of Cu—Zr—Al bulk metallic glass composites with improved tensile properties", Acta Materialia 59, Feb. 19, 2011, pp. 2928-2936.
Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.
Yin, Enhuai et al. "Microstructure and mechanical properties of a spray-formed Ti—based metallic glass former alloy", Journal of Alloys and Compounds, Jan. 25, 2012, vol. 512, pp. 241-245.
Zachrisson et al., "Effect of Processing on Charpy impact toughness of metallic glass matrix composites", Journal of Materials Research, May 28, 2011, vol. 26, No. 10, pp. 1260-1268.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe—based amorphous coating by thermal spraying", Appl. Phys. Lett., Sep. 20, 2012, vol. 101, pp. 121603-1-121603-4.
Zhang et al., "Wear behavior of a series of Zr—based bulk metallic glasses", Materials Science and Engineering, Feb. 25, 2008, vol. A475, pp. 124-127.
Zhou et al., "Microstructure and Electrochemical Behavior of Fe—Based Amorphous Metallic Coatings Fabricated by Atmospheric Plasma Spraying", Journal of Thermal Spray Technology, Jan. 2011, vol. 20, No. u-2, pp. 344-350, Aug. 17, 2010.
Zhu et al., "Ta—particulate reinforced Zr—based bulk metallic glass matrix composite with tensile plasticity", Scripta Materialia, Mar. 2010, vol. 62, Issue 5, pp. 278-281.
Zhuo et al., "Spray formed Al—based amorphous matrix nanocomposite plate", ScienceDirect, Journal of Alloys and Compounds, Mar. 1, 2011, vol. 509, pp. L169-L173.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.

(56) References Cited

OTHER PUBLICATIONS

Abdeljawad et al., "Continuum Modeling of Bulk Metallic Glasses and Composites", Physical Review Letters, vol. 105, 205503, Sep. 17, 2010, pp. 125503-1-125503-4.
Abrosimova et al., "Crystalline layer on the surface of Zr—based bulk metallic glasses", Journal of Non-Crystalline solids, Mar. 6, 2001, vol. 288, pp. 121-126.
An et al., "Synthesis of single-component metallic glasses by thermal spray of nanodroplets on amorphous substrates", Applied Physics Letters, Jan. 26, 2012, vol. 100, pp. 041909-1-041909-4.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326.
Bakkal, "Sliding tribological characteristics of Zr—based bulk metallic glass under lubricated conditions", Intermetallics, Mar. 19, 2010, vol. 18, pp. 1251-1253.
Bardt et al., "Micromolding three-dimensional amorphous metal structures", J. Mater. Res, Feb. 2007, vol. 22, No. 2, pp. 339-343.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631.
Boopathy et al., "Near-threshold fatigue crack growth in bulk metallic glass composites", J. Mater. Res., Dec. 2009, vol. 24, No. 12, pp. 3611-3619.
Bordeenithikasem et al., "Glass forming ability, flexural strength, and wear properties of additively manufactured Zr—based bulk metallic glasses produced through laser powder bed fusion", Additive Manufacturing, Mar. 21, 2018, vol. 21, pp. 312-317.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs., Oct. 1, 2001.
Cadney et al., "Cold gas dynamic spraying as a method for freeforming and joining materials", Science Direct, Surface & Coatings Technology, Mar. 15, 2008, vol. 202, pp. 2801-2806.
Calin et al., "Improved mechanical behavior of Cu—Ti—based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652.
Cheng, J. B. "Characterization of mechanical properties of FeCrBSiMn-NbY metallic glass coatings", J Mater Sci., Apr. 16, 2009, vol. 44, pp. 3356-3363.
Cheng et al., "Correlation of the microstructure and mechanical properties of Zr—based in-situ bulk metallic glass matrix composites", Intermetallics, Sep. 24, 2010, vol. 18, Issue 12, pp. 2425-2430.
Choi et al., "Tribological behavior of the kinetic sprayed $Ni_{59}Ti_{16}Zr_{20}Si_2Sn_3$", Journal of Alloys and Compounds, May 31, 2007, vol. 434-435, pp. 64-67.
Conner et al., "Shear band spacing under bending of Zr—based metallic glass plates", Acta Materialia, Jan. 27, 2004, vol. 52, pp. 2429-2434.
Conner et al., "Shear bands and cracking of metallic glass plates in bending", Journal of Applied Physics, Jul. 15, 2003, vol. 94, No. 2, pp. 904-911.
Dai et al., "A new centimeter-diameter Cu—based bulk metallic glass", Scripta Materialia, Jan. 20, 2006, vol. 54, pp. 1403-1408.
Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs.
Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti—based bulk metallic glasses excluding late transition metals", Scripta Materialia, Mar. 2008, vol. 58, pp. 465-468.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, vol. 528. pp. 74-78.
Fan et al., "Metallic glass matrix composite with precipitated ductile reinforcement", Applied Physics Letters, Aug. 5, 2002, vol. 81, Issue 6, pp. 1020-1022.
Fleury et al., "Tribological properties of bulk metallic glasses", Materials Science and Engineering, Jul. 2004, vol. A375-377, pp. 276-279.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717.
Fu et al., "Sliding behavior of metallic glass Part I. Experimental investigations", Wear, Oct. 2001, vol. 250, pp. 409-419.
Ganesan et al., "Bonding behavior studies of cold sprayed copper coating on the PVC polymer substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112.
Guo et al., "Tensile ductility and necking of metallic glass", Nature Materials, Oct. 2007, vol. 6, pp. 735-739.
Ha et al., "Tensile deformation behavior of two Ti—based amorphous matrix composites containing ductile β dendrites", Materials Science and Engineering: A, May 28, 2012, vol. 552, pp. 404-409.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4.
Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836.
Hays, C. C. "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
He et al., "Novel Ti—base nanostructure—dendrite composite with enhanced plasticity", Nature Materials, Jan. 2003, Published Dec. 8, 2002, vol. 2, pp. 33-37, doi: 10.1038/nmat792.
Hejwowski et al., "A comparative study of electrochemical properties of metallic glasses and weld overlay coatings", Vacuum, Feb. 2013, vol. 88, pp. 118-123, Feb. 20, 2012.
Hofmann, "Bulk Metallic Glasses and Their Composites: A Brief History of Diverging Fields", Journal of Materials, Jan. 2013, vol. 2013, 7 pgs.

(56) References Cited

OTHER PUBLICATIONS

Hofmann, "Shape Memory Bulk Metallic Glass Composites", Science, Sep. 10, 2010, vol. 329, pp. 1294-1295.

* cited by examiner

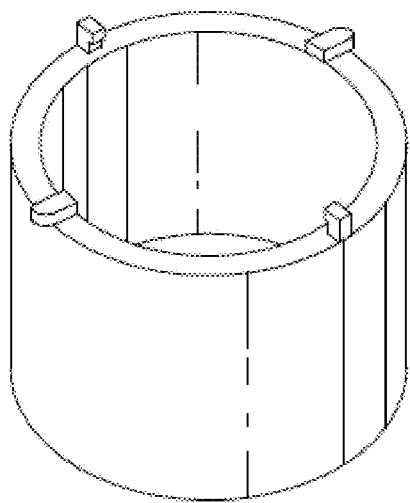 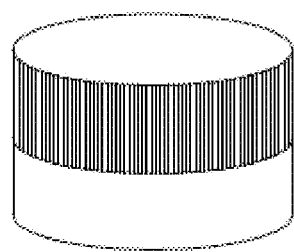
FIG. 15E                    FIG. 15F

SYSTEMS AND METHODS FOR IMPLEMENTING TAILORED METALLIC GLASS-BASED STRAIN WAVE GEARS AND STRAIN WAVE GEAR COMPONENTS

CROSS-REFERENCE TO RELATED APPLICATIONS

The current application is a divisional of U.S. application Ser. No. 15/062,902, filed Mar. 7, 2016, which claims priority to U.S. Provisional Application No. 62/128,827, filed Mar. 5, 2015, the disclosures of which are incorporated herein by reference in their entireties.

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to metallic glass-based strain wave gears and strain wave gear components.

BACKGROUND

Strain wave gears, also known as harmonic drives, are unique gearing systems that can provide high reduction ratios, high torque-to-weight and torque-to-volume ratios, near-zero backlash (which can mitigate the potential wearing of the components), and a host of other benefits. Typically, strain wave gears include an elliptical wave generator that is fitted within a flexspline such that the flexspline conforms to the elliptical shape of the wave generator; this arrangement also typically includes a set of ball bearings that allow the flexspline to rotate about the central axis of the elliptical shape relative to the wave generator. The flexspline is generally disposed within a ring-shaped circular spline, where the flexspline includes a set of gear teeth along its outer, elliptically shaped, perimeter that engage with gear teeth disposed along the inner circumference of the rim-shaped circular spline. Typically, the flexspline has fewer teeth than the circular spline. Notably, the flexspline is made of a flexible material such that when gear teeth of the flexspline and circular spline are engaged, the wave generator can rotate relative to the circular spline in a first direction, and thereby cause the deformation and associated rotation of the flexspline in a second opposite direction. Normally, an input torque is provided to the wave generator, and the flexspline generates a resulting output torque. Typically, the rate of rotation of the wave generator is much greater than the rate of rotation of the flexspline. Thus, strain wave gears can achieve high reduction ratios relative to gearing systems and can do so in a smaller form factor.

Note that in some alternative arrangements, the flexspline is held fixed, and the circular spline is used to provide an output torque.

As can be inferred, the operation of a strain wave gear is particularly nuanced and relies on a very precisely engineered gearing system. For example, the geometries of the constituent parts of strain wave gears must be fabricated with extreme accuracy in order to provide the desired operation. Moreover, the strain wave gear components must be fabricated from materials that can provide for the desired functionality. In particular, the flexspline must be flexible enough to withstand high-frequency periodic deformation, while at the same time being strong enough to accommodate the loads that the strain wave gear is anticipated to be subjected to.

Because of these constraints, heritage strain wave gears have largely been fabricated from steel, as steel has been demonstrated to possess the requisite materials properties, and steel can be machined into the desired geometries. However, the machining of steel into the constituent components can be fairly expensive. For example, in many instances, steel-based strain wave gears can cost on the order of $1,000 to $2,000 largely because of the expensive manufacturing processes.

In some instances, harmonic drives are fabricated from thermoplastic materials. Thermoplastic materials (e.g. polymers) can be cast (e.g. via injection molding processes) into the shapes of the constituent components, and thereby circumvent the expensive machining processes that are typically implemented in manufacturing steel-based strain wave gears. However, strain wave gears fabricated from thermoplastics may not be as strong as strain wave gears fabricated from steel.

SUMMARY OF THE INVENTION

Systems and methods in accordance with embodiments of the invention implement tailored metallic glass-based strain wave gears and strain wave gear components. In one embodiment, a method of fabricating a flexspline of a strain wave gear includes: forming a MG-based composition into a flexspline using one of a thermoplastic forming technique and a casting technique; where the forming of the MG-based composition results in a formed MG-based material; where the formed flexspline is characterized by: a minimum thickness of greater than approximately 1 mm and a major diameter of less than approximately 4 inches.

In another embodiment, the MG-based composition is formed into a flexspline using a casting technique.

In yet another embodiment, the MG-based composition is formed into a flexspline by casting it around a solid body.

In still another embodiment, the formed MG-based material has an entirely amorphous structure.

In still yet another embodiment, the formed MG-based material is a metallic glass matrix composite.

In a further embodiment, the formed MG-based material is further characterized by the inclusion of gear teeth.

In a yet further embodiment, the gear teeth are S-shaped.

In a still further embodiment, the MG-based composition is a Titanium-based MG-based composition.

In a still yet further embodiment, the method further includes selecting a MG-based composition for implementation based on desired flexspline performance.

In another embodiment, the selected MG-based composition includes constituent alloying elements, the presence of which causes the formed MG-based material to possess at least certain of the desired materials properties.

In yet another embodiment, the selected MG-based composition includes at least one of one of V, Nb, Ta, Mo, and Sn, when it is desired that the MG-based material to be formed be relatively more flexible.

In still another embodiment, the formation of the flexspline is a net shape process.

In still yet another embodiment, the formed flexspline is characterized by a maximum thickness of less than approximately 3 mm.

In a further embodiment, the MG-based composition is formed using a thermoplastic forming technique.

In a yet further embodiment, the thermoplastic forming technique is one of: a capacitive discharge forming technique; a frictional heating technique; and a blow molding technique.

In a still further embodiment, the forming of the MG-based composition includes: heating a first region of the MG-based composition to a temperature greater than the glass transition temperature of the MG-based composition; where at least some portion of the MG-based composition, that is continuous through the thickness of the MG-based composition, is not heated above its respective glass transition temperature when the first region is heated to a temperature greater than the glass transition temperature; and deforming the MG-based material within the first region while the temperature of the MG-based material within the first region is greater than its respective glass transition temperature.

In a still yet further embodiment, the formed MG-based material has an entirely amorphous structure.

In another embodiment, the formed MG-based material is a metallic glass matrix composite.

In yet another embodiment, the MG-based composition is a Titanium-based MG-based composition.

In still another embodiment, the forming of MG-based composition includes both a thermoplastic forming technique and a casting technique.

BRIEF DESCRIPTION OF THE DRAWINGS

FIGS. 15A-15F illustrate the formation of a flexspline according to the process outlined in FIG. 6 in accordance with certain embodiments of the invention.

DETAILED DESCRIPTION

Figure 1:
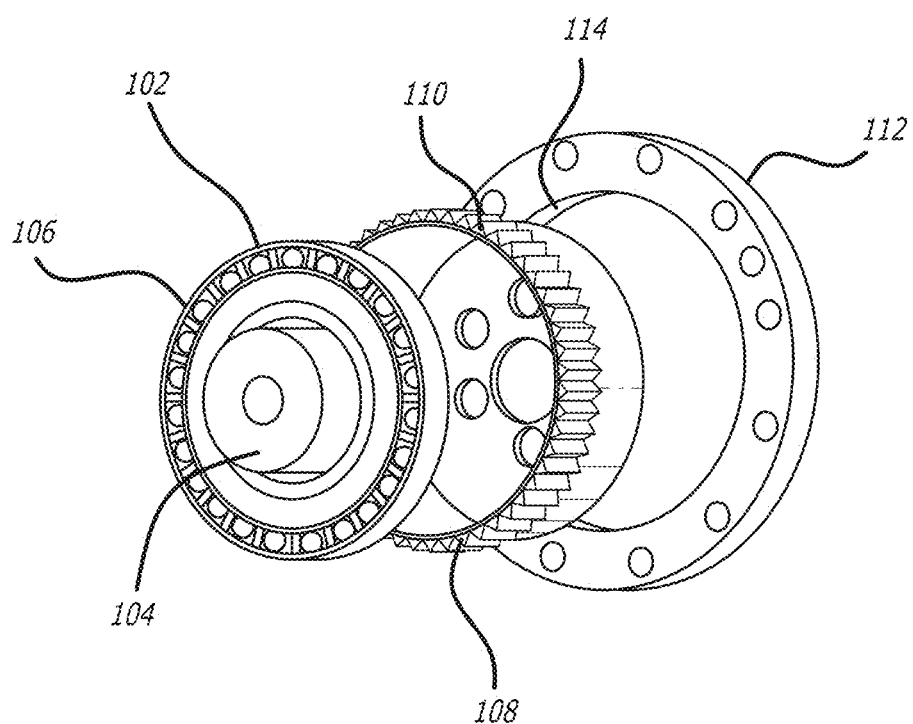
FIG. 1 illustrates a strain wave gear that can be fabricated from a MG-based material in accordance with certain embodiments of the invention.

Turning now to the drawings, systems and methods for implementing tailored metallic glass-based strain wave gears and strain wave gear components are illustrated. Metallic glasses, also known as amorphous alloys (or alternatively amorphous metals), are characterized by their disordered atomic-scale structure in spite of their metallic constituent elements—i.e., whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, the manufacture of metallic glass materials lends itself to relatively easy processing. In particular, the manufacture of a metallic glass can be compatible with an injection molding process, or any similar casting process.

Nonetheless, the manufacture of metallic glasses presents challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooing rates, e.g., on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g., greater than 1 mm). These thicker metallic glasses are known as 'bulk metallic glasses' ("BMGs".)

In addition to the development of BMGs, 'bulk metallic glass matrix composites' (BMGMCs) have also been developed. BMGMCs are characterized in that they possess the amorphous structure of BMGs, but they also include crystalline phases of material within the matrix of the amorphous structure. For example the crystalline phases can exist in the form of dendrites. The crystalline phases can allow the material to have enhanced ductility, compared to where the material is entirely constituted of the amorphous structure. BMGs and BMGMCs can be referred to collectively as BMG-based materials. Similarly, metallic glasses, metallic glasses that include crystalline phase inclusions, BMGs, and BMGMCs can be referred to collectively as metallic glass-based materials or MG-based materials.

Even with these developments, the current state of the art has yet to fully appreciate the advantageous materials properties of MG-based materials. As a consequence, MG-based materials have seen limited use in engineering applications. For example, various publications have concluded, and it is largely established, that the viability of MG-based materials is mostly limited to microscale structures. (See e.g., G. Kumar et al., Adv. Mater. 2011, 23, 461-476, and M. Ashby et al., Scripta Materialia 54 (2006) 321-326, the disclosures of which are hereby incorporated by reference.) This is in part because the material properties, including the fracture mechanics, of MG-based materials are correlated with the specimen size. For example, it has been observed that the ductility of a MG material is inversely correlated with its thickness. (See e.g., Conner, Journal of Applied Physics, Volume 94, Number 2, Jul. 15, 2003, pgs. 904-911, the disclosure of which is hereby incorporated by reference.) Essentially, as component dimensions become greater, they become more and more prone to brittle failure. Thus, for these reasons and others, those skilled in the art have generally counseled that although MG-based materials may make for excellent materials for microscale structures, e.g. MEMS devices, they generally should not be used for macroscale components. (See e.g., G. Kumar et al., Adv. Mater. 2011, 23, 461-476.) Indeed, G. Kumar et al. have related brittle failure to the plastic zone size, and have generalized that a specimen thickness of approximately 10 times the plastic zone radius can exhibit 5% bending plasticity. (Id.) Thus, G. Kumar et al. conclude that a 1 mm thick specimen of Vitreloy can exhibit 5% bend plasticity. (Id.)

While the conventional understanding has suggested limited applications for MG-based materials, it has also touted the wear-resistant aspects of MG-based materials. (see e.g., Wu, Trans. Nonferrous Met. Soc. China 22 (2012), 585-589; Wu, Intermetallics 25 (2012) 115-125; Kong, Tribal Lett (2009) 35:151-158; Zenebe, Tribol Lett (2012) 47:131-138; Chen, J. Mater. Res., Vol. 26, No. 20, Oct. 28, 2011; Liu, Tribol Lett (2012) 46:131-138; the disclosures of which are hereby incorporated by reference.) To be clear, "wear" conventionally refers to the displacement of the surface of a material as a direct result of its mechanical interaction with another material. It is generally understood that a material's resistance to wear generally increases with its hardness, i.e. the harder a material is, the less susceptible it is to wear. (See e.g., I. L. Singer, Wear, Volume 195, Issues 1-2, July 1996, Pages 7-20.) Based on these understandings, it has been suggested that the predicted wear-resistance characteristics of MGs may make them excellent candidates for materials from which to fabricate miniature gears, given that gears are subject to extensive mechanical interaction and are thereby subject to wear. (See e.g., Chen, J. Mater. Res., Vol. 26, No. 20, Oct. 28, 2011; Huang, Intermetallics 19 (2011) 1385-1389; Liu, Tribol Lett (2009) 33:205-210; Zhang, Materials Science and Engineering A, 475 (2008) 124-127; Ishida, Materials Science and Engineering A, 449-451 (2007) 149-154; the disclosures of which are hereby incorporated by reference.) Thus, in accordance with the above-described insights, gears on a microscale have been fabricated (See e.g., Ishida, Materials Science and Engineering A, 449-451 (2007) 149-154, the disclosure of which is hereby incorporated by reference.)

However, contrary to the above-described conventional wisdom, Hofmann et al. have demonstrated that MG-based materials can be beneficially implemented in a variety of other applications. For example, U.S. patent application Ser. No. 13/928,109 to Hofmann et al. describes how MG-based materials can be developed for the fabrication of gears on a macroscale. In particular, U.S. patent application Ser. No. 13/928,109 explains that while Ishida demonstrated the fabrication of MG-based gears, the demonstration was limited inasmuch as the fabricated gears were of smaller dimensions (and thereby weren't subjected to the same modes of failure as macroscopic engineering component) and the gears operated using lubricant, which can mitigate tendencies for brittle fracture. (Id.) Generally, Hofmann et al. explain that the prior art has been principally concerned with harnessing the wear resistance properties of MG-based materials, and consequently focused on implementing the hardest MG-based materials. (Id.) This design methodology is limiting insofar as the hardest materials are more prone to other modes of failure. (Id.) Indeed, Hofmann et al. demonstrate that implementing the hardest MG-based materials in the fabrication of macroscale gears generally yields gears that fracture during operation. (Id.) Accordingly, Hofmann et al. disclose that MG-based materials can be developed to have favorable properties with respect to fracture toughness, and thereby can be made to fabricate macroscale gears that do not necessarily require lubricant to function. (Id.) The disclosure of U.S. patent application Ser. No. 13/928,109 is hereby incorporated by reference in its entirety, especially as it pertains to metallic glass-based materials, and their implementation in macroscale gears. Moreover, U.S. patent application Ser. No. 13/942,932 to Hofmann et al. discloses that MG-based materials possess other favorable materials properties that can also allow them to be used in the fabrication of macroscale compliant mechanisms. The disclosure of U.S. patent application Ser. No. 13/942,932 is hereby incorporated by reference in its entirety, especially as it pertains to metallic glass-based materials, and their implementation in macroscale compliant mechanisms.

The potential of metallic glass-based materials continues to be explored, and developments continue to emerge. For example, in U.S. patent application Ser. No. 14/060,478, D. Hofmann et al. disclose techniques for depositing layers of metallic glass-based materials to form objects. The disclosure of U.S. patent application Ser. No. 14/060,478 is hereby incorporated by reference especially as it pertains to metallic glass-based materials, and techniques for depositing them to form objects. Furthermore, in U.S. patent application Ser. No. 14/163,936, D. Hofmann et al., disclose techniques for additively manufacturing objects so that they include metallic glass-based materials. The disclosure of U.S. patent application Ser. No. 14/163,936 is hereby incorporated by reference in its entirety, especially as it pertains to metallic glass-based materials, and additive manufacturing techniques for manufacturing objects so that they include metallic glass-based materials. Additionally, in U.S. patent application Ser. No. 14/177,608, D. Hofmann et al. disclose techniques for fabricating strain wave gears using metallic glass-based materials. The disclosure of U.S. patent application Ser. No. 14/177,608 is hereby incorporated by reference in its entirety, especially as it pertains to metallic glass-based materials, and their implementation in strain wave gears. Moreover, in U.S. patent application Ser. No. 14/178,098, D. Hofmann et al., disclose selectively developing equilibrium inclusions within an object constituted from a metallic glass-based material. The disclosure of U.S. patent application Ser. No. 14/178,098 is hereby incorporated by reference, especially as it pertains to metallic glass-based materials, and the tailored development of equilibrium inclusions within them. Furthermore, in U.S. patent application Ser. No. 14/252,585, D. Hofmann et al. disclose techniques for shaping sheet materials that include metallic glass-based materials. The disclosure of U.S. patent application Ser. No. 14/252,585 is hereby incorporated by reference in its entirety, especially as it pertains to metallic glass-based materials and techniques for shaping sheet materials that include metallic glass-based materials. Additionally, in U.S. patent application Ser. No. 14/259,608, D. Hofmann et al. disclose techniques for fabricating structures including metallic glass-based materials using ultrasonic welding. The disclosure of U.S. patent application Ser. No. 14/259,608 is hereby incorporated by reference in its entirety, especially as it pertains to metallic glass-based materials and techniques for fabricating structures including metallic glass-based materials using ultrasonic welding. Moreover, in U.S. patent application Ser. No. 14/491,618, D. Hofmann et al. disclose techniques for fabricating structures including metallic glass-based materials using low pressure casting. The disclosure of U.S. patent application Ser. No. 14/491,618 is hereby incorporated by reference in its entirety, especially as it pertains to metallic glass-based materials and techniques for fabricating structures including metallic glass-based materials using low pressure casting. Furthermore, in U.S. patent application Ser. No. 14/660,730, Hofmann et al. disclose metallic glass-based fiber metal laminates. The disclosure of U.S. patent application Ser. No. 14/660,730 is hereby incorporated by reference in its entirety, especially as it pertains to metallic glass-based fiber metal laminates. Additionally, in U.S. patent application Ser. No. 14/971,848, Kennett et al. disclose fabricating gearbox housings from metallic glass-based materials. The disclosure of U.S. patent application Ser. No. 14/971,848 is hereby incorporated by reference in its entirety, especially as it pertains to fabricating gearbox housings from metallic glass-based materials and also as it pertains to casting metallic glass-based materials around a solid body to form useful objects.

Notwithstanding all of these developments, the vast potential of metallic glass-based materials has yet to be fully appreciated. The instant application discloses how MG-based materials can be implemented in the creation of highly customized and/or robust strain wave gears and strain wave gear components. Note that MG-based materials can be developed so that they have high fatigue resistance, high fracture toughness, excellent sliding friction properties, a low density, and a high elasticity. Moreover, these and other characteristics can be largely tunable, e.g. by alloying a given MG-based material or else applying some other processing (e.g. heat treating) to a MG-based material. This versatility can enable the implementation of highly customized and efficacious strain wave gears and/or strain wave gearing components; e.g. they can be made to sustain greater operating loads, be lighter, and/or have longer life cycles. Notably, the characteristics that MG-based materials can offer can give rise to unique design considerations that can enable the implementation of more robust configurations relative to those seen in conventional strain wave gears. The general operation of strain wave gears is now discussed in detail below.

Strain Wave Gear Operation

In many embodiments of the invention, strain wave gears and strain wave gear components are provided that incorporate MG-based materials and thereby have improved performance characteristics. To provide context, the basic operating principles of strain wave gears are now reviewed.

FIG. 1 illustrates an exploded view of a typical strain wave gear that can be fabricated from MG-based materials in accordance with embodiments of the invention. In particular, the strain wave gear 100 includes a wave generator 102, a flexspline 108, and a circular spline 112. The illustrated wave generator 102 includes a wave generator plug 104 and a ball bearing 106. Importantly, the wave generator plug 104 is elliptical in shape, and is disposed within the ball bearing 106 so that the ball bearing 106 to conforms to the elliptical shape. In this arrangement, the outer race of the ball bearing 106 can rotate relative to the wave generator plug 104. In the illustrated embodiment, the flexspline 108 is depicted as being in the shape of a cup; notably, the outer rim of the cup includes a set of gear teeth 110. In the illustration, the flexspline is fitted over the ball bearing, such that the outer rim of the flexspline conforms to the aforementioned elliptical shape. Note that in this arrangement, the ball bearing allows the flexspline to rotate relative to the wave generator plug. The circular spline, 112 is in the shape of a ring; importantly, the inner perimeter of the ring includes a set of gear teeth. Normally, there are more gear teeth on the circular spline 114 than on the flexspline 110. In many instances there are two more gear teeth on the circular spline 112 than on the flexspline 108. Typically, the flexspline 108 is fitted within the circular spline 112 such that the gear teeth of the flexspline 110 engage the gear teeth of the circular spline 114. Notably, because the gear teeth of the flexspline 110 conform to an elliptical shape, only the gear teeth proximate the major axis of the elliptical shape engage the gear teeth of the circular spline 114 in the usual case. Conversely, the gear teeth of the flex spline 110 that are proximate the minor axis of the elliptical shape are disengaged from the gear teeth of the circular spline 114. In many instances, 30% of the gear teeth of the flexspline 110 are engaged with the gear teeth of the circular spline 114. With this arrangement, the wave generator plug 104 can rotate in a first direction about the central axis of the elliptical shape, and thereby cause the flexspline 108 to rotate in a second opposite direction and at a different rate of rotation (generally slower) about the central axis of the elliptical shape. This can be achieved as the flexspline 108 is made of a flexible material that can accommodate the deflections that may result from the rotation of the wave generator plug 104.

Figures 2A, 2B:
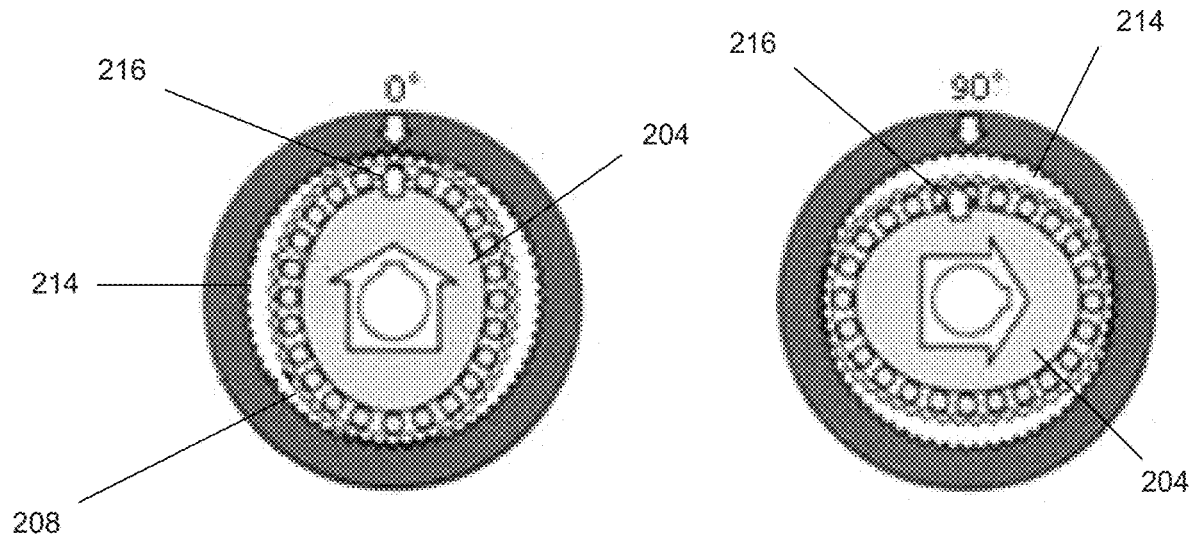
FIGS. 2A-2D illustrate the operation of a strain wave gear in accordance with certain embodiments of the invention.
Figures 2C, 2D:
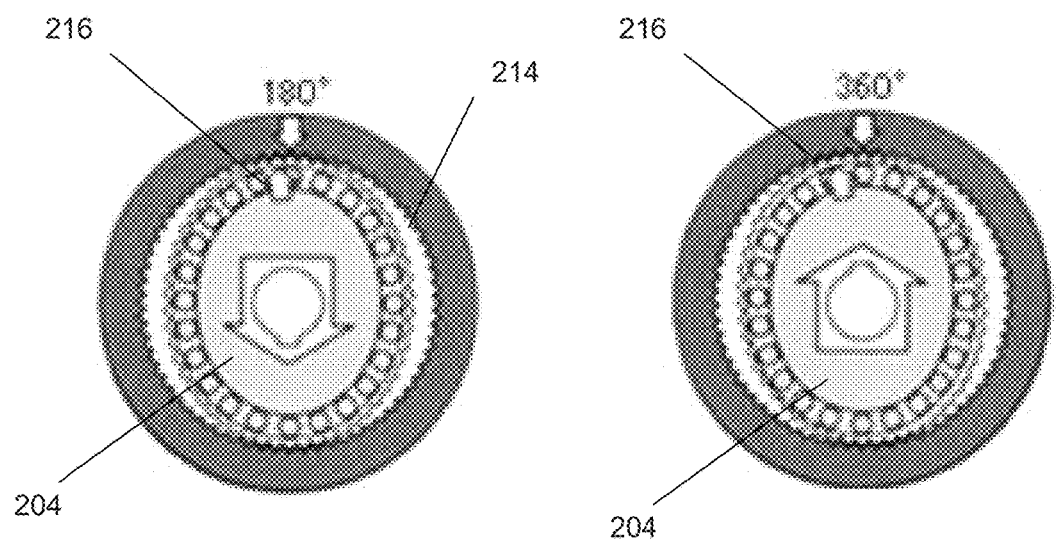

FIGS. 2A-2D depict the normal operation of a strain wave gear that can be fabricated from MG-based materials in accordance with embodiments of the invention. In particular, FIG. 2A illustrates a strain wave gear, where the wave generator plug 204 is in a first orientation such that the major axis of the elliptical shape is vertical relative to the drawing. This starting position is designated as '0°'. An arrow 216 designates one of the gear teeth of the flexspline 208 that is considered in FIGS. 2A-2D for purposes of illustration. FIG. 2B illustrates that the wave generator plug 204 has rotated clockwise 90°. The rotation of the wave generator plug 204 has caused the flexspline 208 to deflect in a particular fashion; as a result, the gear tooth corresponding with the arrow 216 is disengaged from the gear teeth of the circular spline 214. Notably, the gear tooth corresponding with the arrow 216, has rotated slightly counterclockwise in association with the 90° clockwise rotation of the wave generator plug 204. FIG. 2C illustrates that the wave generator plug 204 has rotated clockwise another 90° so that it has now rotated 180° clockwise relative to the initial starting position. In the illustration, gear tooth designated by the arrow 216 has reengaged the gear teeth of the circular spline 214 at a position slightly counterclockwise relative to the initial starting position. FIG. 2D illustrates that the wave generator plug 204 has rotated a full 360° clockwise relative to the initial starting position. Consequently, the gear tooth indicated by 216 has rotated slightly further counterclockwise than the position seen in FIG. 2C. In general, it is seen in FIGS. 2A-2D that a full 360° rotation of a wave generator plug 204 in one direction results in a slight rotation of the flexspline 208 in an opposite direction. In this way, strain wave gears can achieve relatively high reduction ratio within a small footprint. Typically an input torque is applied to the wave generator plug 204, while the flexspline 208 provides a corresponding output torque.

Of course, it should be understood that while an example of a strain wave gear design is illustrated and discussed above, any suitable strain wave gear design and any suitable strain wave gear components can be fabricated from MG-based materials in accordance with embodiments of the invention. For example, the flexspline can take any suitable shape, and is not required to be 'cup-shaped.' Similarly, any type of bearing can be implemented—not just a ball bearing. For example, needle roller bearings may be implemented. To be clear, the instant application is not meant to be limited to any particular strain wave gear design or strain wave gear component design. It is now discussed how MG-based materials can be implemented within strain wave gear components to enhance the performance of strain wave gears in accordance with embodiments of the invention.

Metallic Glass-Based Strain Wave Gears and Strain Wave Gear Components

Figure 3A:
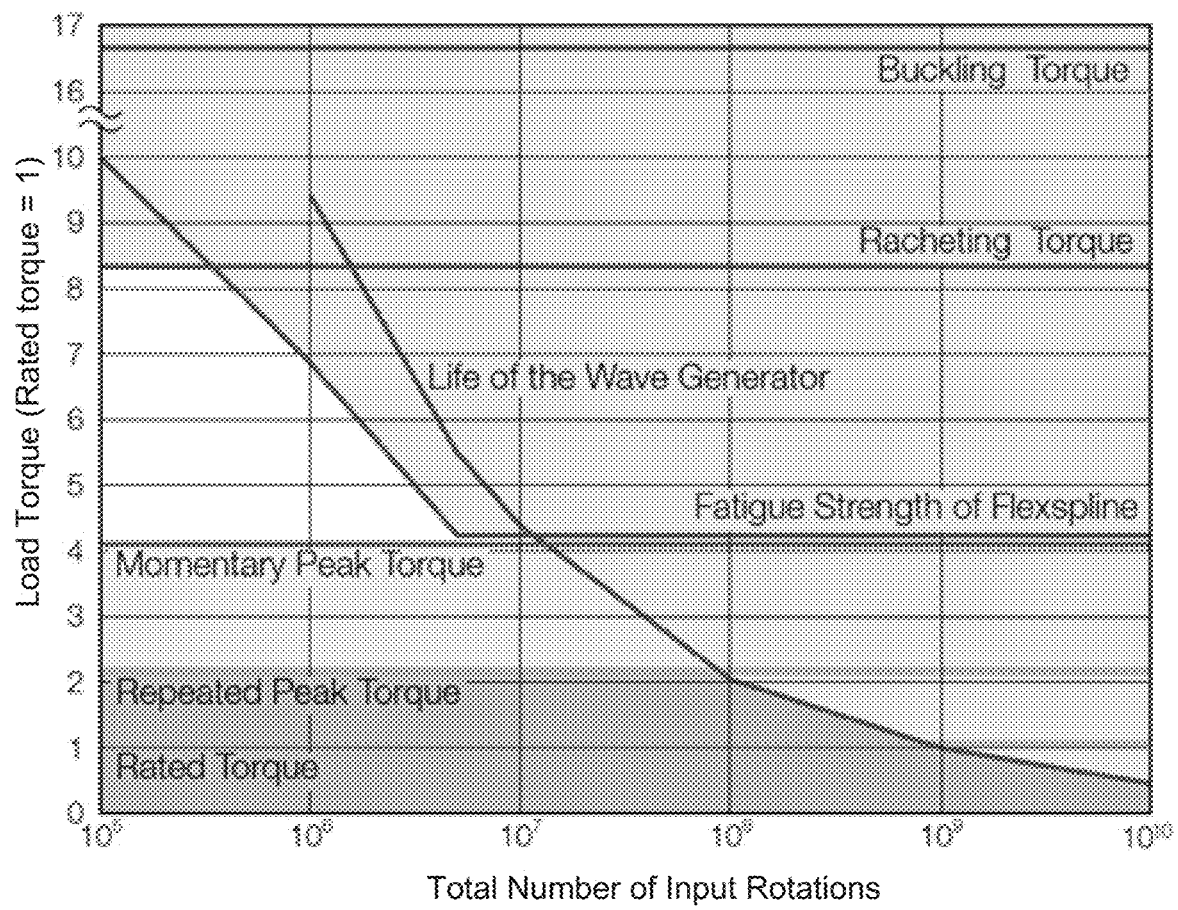
FIGS. 3A-3B illustrate the life expectancy of strain wave gears generally.
Figure 3B:
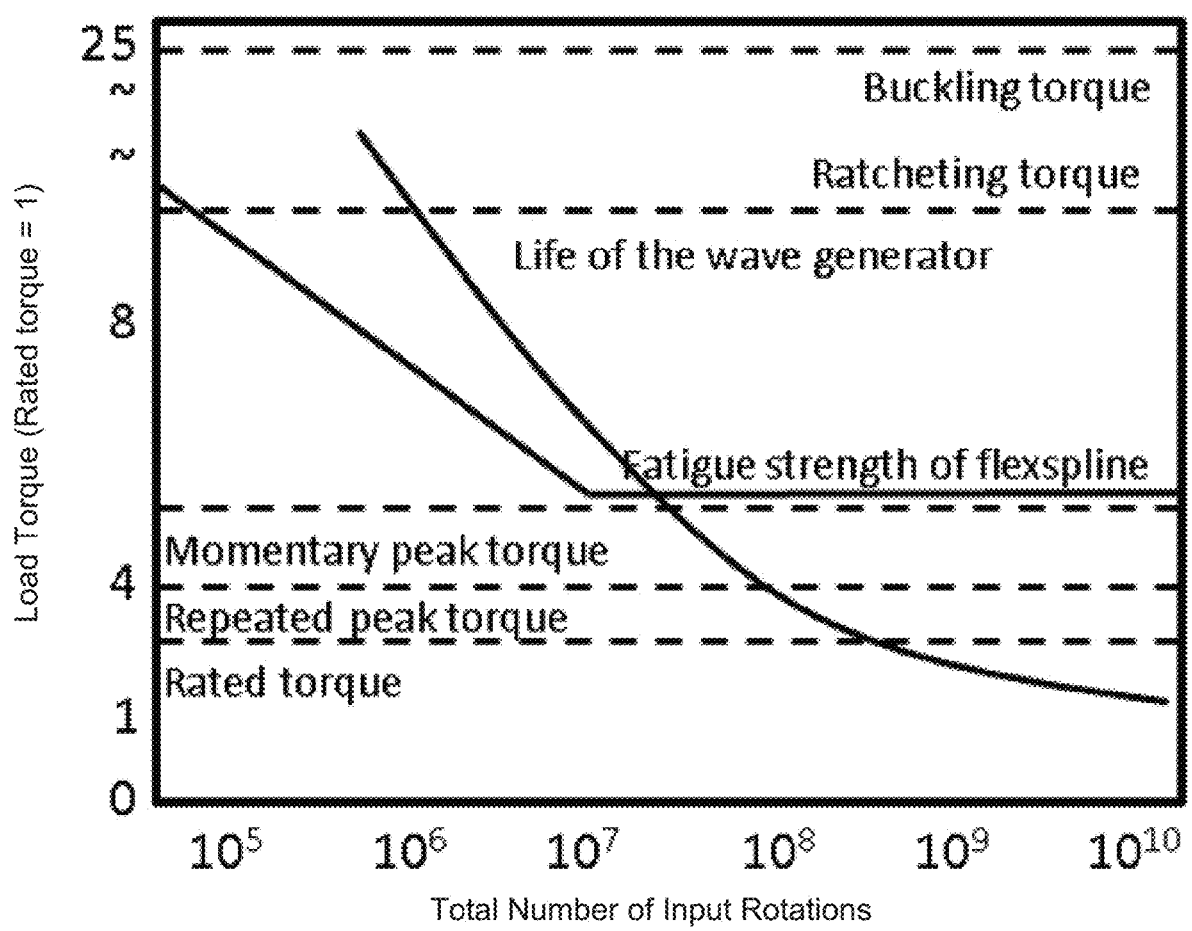

In many embodiments of the invention, MG-based materials are incorporated within strain wave gears and/or strain wave gear components. In many instances, MG-based materials can be developed to possess desired materials properties that can make them very-well suited for the fabrication of the constituent components of a strain wave gear. For example, from the above-described strain wave gear operating principles, it is evident that the ball bearing and the flexspline deflect in a periodic fashion with the rotation of the wave generator plug. As a result, it would be desirable that those components be fabricated from materials that have high fatigue strength. For example, FIGS. 3A and 3B depict how the fatigue strength of the flexspline is a principal determinant of the life of a strain wave gear. Notably, the flexspline in a strain wave gear typically fails when the flexspline fatigues (as opposed to other modes of failure), which causes it to permanently deform. In particular, FIG. 3A illustrates various representative torque specifications relative to rated torque for steel strain wave gears, and FIG. 3B illustrates the same information for MG-based strain wave gears. For FIGS. 3A-3B, the rated torque has been normalized to 1 and the strain wave gears are assumed to have similar geometric configurations for purposes of comparison.

Generally, the fatigue limit of a material is defined by the number of times that the material can be stressed at a particular level before the material permanently deforms. Assuming the same cyclic load is applied many times, the lower the load, the longer the materials will last before it deforms. The cyclic load at which a material can survive $10^7$ cycles is generally referred to as the fatigue limit of the material. If the material is cyclically loaded at its yield strength, it would presumably fail in one cycle. Thus, fatigue limits are generally reported as a percentage of their yield strength (to normalize their performance). As an illustration, a 300M steel has a fatigue limit which is 20% of its yield strength. If one assumes a fixed geometry of a part being fatigued, as with a flexspline, incorporating a more flexible material results in a lower stress per cycle, which can result in a much longer fatigue life.

Accordingly, MG-based materials can be favorably incorporated within a flexspline of a strain wave gear to provide enhanced fatigue performance. For example, MG-based materials can have an elastic limit as high as 2%, and can also have a stiffness about 3 times lower than steel-based materials. Typically, many MG-based materials can demonstrate elastic limits that are greater than approximately 1%, and it is these MG-based materials that can be particularly well-suited for implementation within strain wave gear components. Many MG-based materials can demonstrate elastic limits that are greater than approximately 1.5%. By contrast, 304 stainless steel has been reported to have an elastic limit of 0.1%. Generally, this implies that a flexspline fabricated from a MG-based material can experience lower stress per unit of deformation relative to a steel-based flexspline having an identical geometry (e.g. as measured by a respective material's yield strength). Correspondingly, the MG-based material can have much more favorable fatigue properties, e.g. a material that is subjected to less relative stress tends to be capable of withstanding more loading cycles. Importantly, whereas MG-based materials are often considered to be brittle and susceptible to fatigue failure by other measures, they can demonstrate great fatigue resistance when the applied stresses that they are subjected to are relatively less.

Note also that the differing stiffness values impact the geometries of the fabricated components. Thus, because MG-based materials can have relatively lower stiffness values (e.g. relative to steel), they can allow for strain wave gear components that have more favorable geometries. For example, a relatively lower stiffness can enable the implementation of a thicker flexspline, which can be advantageous. Indeed, the materials properties profile of MG-based materials generally can enable the development of more favorable geometries—i.e. in addition to stiffness, the other materials properties of MG-based materials can also contribute to the development of advantageous geometries.

Moreover, as is understood from the prior art, MG-based materials can have higher hardness values, and correspondingly demonstrate improved wear performance relative to heritage engineering materials. Materials with high hardness values can be particularly advantageous in strain wave gears, as the constituent components of strain wave gears are in continuous contact with one another and are subject to, for example, sliding friction. Generally, when gear teeth are subjected to a constant load and accompanying friction, the resulting associated elastic deformation and wear can precipitate 'ratcheting'. That MG-based materials can have a high hardness value, good resistance to wear (including a good resistance to galling), and high elasticity—even when subjected to high loads—can make them well-suited to be implemented within a strain wave gear. For example, the implementation of MG-based materials within the gear teeth of a strain wave gear can deter ratcheting. Furthermore, MG-based materials can be made to have a high hardness value throughout a broad temperature range. For example, MG-based materials can have a hardness value that does not vary as a function of temperature by more than 20% within the temperature range of 100K to 300K. Indeed, MG-based materials can have a strength that does not vary as a function of temperature by more than 20% within a temperature range of 100K to 300K. In general, the implementation of MG-based materials within strain wave gears can be favorable on many levels. Table 1 below illustrates how the materials properties of certain MG-based materials possess improved materials properties relative to heritage engineering materials in many respects.

TABLE 1

Material Properties of MG-Based Materials relative to Heritage Engineering Materials

| Material | Density (g/cc) | Stiffness, E (GPa) | Tensile Yield (MPa) | Tensile UTS (MPa) | Elastic Limit (%) | Specific Strength | Hardness (HRC) |
|---|---|---|---|---|---|---|---|
| SS 15500 H1024 | 7.8 | 200 | 1140 | 1170 | <1 | 146 | 36 |
| Ti—6Al—4V STA | 4.4 | 114 | 965 | 1035 | <1 | 219 | 41 |
| Ti—6Al—6V—4Sn STA | 4.5 | 112 | 1035 | 1100 | <1 | 230 | 42 |
| Nitronic 60 CW | 7.6 | 179 | 1241 | 1379 | <1 | 163 | 40 |
| Vascomax C300 | 8.0 | 190 | 1897 | 1966 | <1 | 237 | 50 |
| Zr-BMG | 6.1 | 97 | 1737 | 1737 | >1.8 | 285 | 60 |
| Ti-BMGMC | 5.2 | 94 | 1362 | 1429 | >1.4 | 262 | 51 |
| Zr-BMGMC | 5.8 | 75 | 1096 | 1210 | >1.4 | 189 | 48 |

Importantly, materials properties of MG-based materials are a function of the relative ratios of the constituent components and are also a function of the crystalline structure. As a result, the materials properties of a MG-based material can be tailored by varying the composition and varying the ratio of crystalline structure to amorphous structure. For example, in many embodiments it may be desirable to implement MG-based materials having a particular materials profile within a particular component of a strain wave gear. In these instances, an appropriate MG-based material may be developed and/or selected from which to fabricate a respective strain wave gear component. Tables 2, 3, and 4 depict how materials properties of MG-based materials can vary based on composition and crystalline structure.

TABLE 2

Material Properties of Select MG-Based Materials as a function of Composition

| name | atomic % | weight % | BMG (%) | bcc (%) | $\rho$ (g/cm$^3$) | $\sigma_y$ (MPa) | $\sigma_{max}$ (MPa) | $\varepsilon_y$ (%) | E (GPa) | $T_s$ (K) |
|---|---|---|---|---|---|---|---|---|---|---|
| DV2 | $Ti_{44}Zr_{20}V_{12}Cu_5Be_{19}$ | $Ti_{41.9}Zr_{36.3}V_{12.1}Cu_{6.3}Be_{3.4}$ | 70 | 30 | 5.13 | 1597 | 1614 | 2.1 | 94.5 | 956 |
| DV1 | $Ti_{48}Zr_{20}V_{12}Cu_5Be_{15}$ | $Ti_{44.5}Zr_{35.2}V_{11.3}Cu_{6.3}Be_{2.6}$ | 53 | 47 | 5.15 | 1362 | 1429 | 2.3 | 94.2 | 955 |
| DV3 | $Ti_{56}Zr_{18}V_{10}Cu_4Be_{12}$ | $Ti_{51.6}Zr_{31.6}V_{9.8}Cu_{4.9}Be_{2.1}$ | 46 | 54 | 5.08 | 1308 | 1309 | 2.2 | 84.0 | 951 |
| DV4 | $Ti_{62}Zr_{15}V_{10}Cu_4Be_9$ | $Ti_{57.3}Zr_{26.4}V_{9.8}Cu_{4.9}Be_{1.6}$ | 40 | 60 | 5.03 | 1086 | 1089 | 2.1 | 83.7 | 940 |
| DVAl1 | $Ti_{60}Zr_{16}V_9Cu_5Al_3Be_9$ | $Ti_{55.8}Zr_{28.4}V_{8.9}Cu_{3.7}Al_{1.6}Be_{1.6}$ | 31 | 69 | 4.97 | 1166 | 1189 | 2.0 | 84.2 | 901 |
| DVAl2 | $Ti_{67}Zr_{11}V_{10}Cu_5Al_2Be_5$ | $Ti_{62.4}Zr_{19.5}V_{9.9}Cu_{6.2}Al_1Be_{0.9}$ | 20 | 80 | 4.97 | 990 | 1000 | 2.0 | 78.7 | 998 |
| Ti-6-4a | $Ti_{86.1}Al_{10.3}V_{3.6}$ | $Ti_{90}Al_6V_4$ (Grade 5 Annealed) | na | na | 4.43 | 754 | 882 | 1.0 | 113.8 | 1877 |
| Ti-6-4s | $Ti_{86.1}Al_{10.3}V_{3.6}$ [Ref] | $Ti_{90}Al_6V_4$ (Grade 5 STA) | na | na | 4.43 | 1100 | 1170 | ~1 | 114.0 | 1877 |
| CP-Ti | $Ti_{100}$ | $Ti_{100}$ (Grade 2) | na | na | 4.51 | 380 | 409 | 0.7 | 105.0 | ~1930 |

TABLE 3

Material Properties of Select MG-Based Materials as a function of Composition

| Alloy | $\sigma_{max}$ (MPa) | $\varepsilon_{tot}$ (%) | $\sigma_y$ (MPa) | $\varepsilon_y$ (%) | E (GPa) | $\rho$ (g/cm$^3$) | G (GPa) | CTT (J) | RoA (%) | $\upsilon$ |
|---|---|---|---|---|---|---|---|---|---|---|
| $Zr_{36.6}Ti_{31.4}Nb_7Cu_{5.0}Be_{19.1}$ (DH1) | 1512 | 9.58 | 1474 | 1.98 | 84.3 | 5.6 | 30.7 | 26 | 44 | 0.371 |
| $Zr_{38.3}Ti_{32.9}Nb_{7.3}Cu_{6.2}Be_{15.3}$ (DH2) | 1411 | 10.8 | 1367 | 1.92 | 79.2 | 5.7 | 28.8 | 40 | 50 | 0.373 |
| $Zr_{39.8}Ti_{33.9}Nb_{7.6}Cu_{6.4}Be_{12.5}$ (DH3) | 1210 | 13.10 | 1096 | 1.62 | 75.3 | 5.8 | 27.3 | 45 | 46 | 0.376 |

TABLE 3-continued

Material Properties of Select MG-Based Materials as a function of Composition

| Alloy | $\sigma_{max}$ (MPa) | $\varepsilon_{tot}$ (%) | $\sigma_y$ (MPa) | $\varepsilon_y$ (%) | E (GPa) | $\rho$ (g/cm$^3$) | G (GPa) | CTT (J) | RoA (%) | $\upsilon$ |
|---|---|---|---|---|---|---|---|---|---|---|
| $Zr_{41.2}Ti_{13.8}Cu_{12.5}Ni_{10}Be_{22.5}$ (Vitreloy 1) | 1737 | 1.98 | — | — | 97.2 | 6.1 | 35.9 | 8 | 0 | 0.355 |
| $Zr_{56.2}Ti_{13.8}Nb_{5.0}Cu_{6.9}Be_{12.6}$ (LM 2) | 1302 | 5.49 | 1046 | 1.48 | 78.8 | 6.2 | 28.6 | 24 | 22 | 0.375 |

TABLE 4

Material Properties as a Function of Composition and Structure, where A is Amorphous, X, is Crystalline, and C is Composite

| | A/X/C | 2.0 Hv | E (GPa) |
|---|---|---|---|
| (CuZr42Al7Be10)Nb3 | A | 626.5 | 108.5 |
| (CuZr46Al5Y2)Nb3 | A | 407.4 | 76.9 |
| (CuZrAl7Be5)Nb3 | A | 544.4 | 97.8 |
| (CuZrAl7Be7)Nb3 | A | 523.9 | 102.0 |
| Cu40Zr40Al10Be10 | A | 604.3 | 114.2 |
| Cu41Zr40Al7Be7Co5 | C | 589.9 | 103.5 |
| Cu42Zr41Al7Be7Co3 | A | 532.4 | 101.3 |
| Cu47.5Zr48Al4Co0.5 | X | 381.9 | 79.6 |
| Cu47Zr46Al5Y2 | A | 409.8 | 75.3 |
| Cu50Zr50 | X | 325.9 | 81.3 |
| CuZr41Al7Be7Cr3 | A | 575.1 | 106.5 |
| CuZrAl5Be5Y2 | A | 511.1 | 88.5 |
| CuZrAl5Ni3Be4 | A | 504.3 | 95.5 |
| CuZrAl7 | X | 510.5 | 101.4 |
| CuZrAl7Ag7 | C | 496.1 | 90.6 |
| CuZrAl7Ni5 | X | 570.0 | 99.2 |
| Ni40Zr28.5Ti16.5Be15 | C | 715.2 | 128.4 |
| Ni40Zr28.5Ti16.5Cu5Al10 | X | 627.2 | 99.3 |
| Ni40Zr28.5Ti16.5Cu5Be10 | C | 668.2 | 112.0 |
| Ni56Zr17Ti13Si2Sn3Be9 | X | 562.5 | 141.1 |
| Ni57Zr18Ti14Si2Sn3Be6 | X | 637.3 | 139.4 |
| Ti33.18Zr30.51Ni5.33Be22.88Cu8.1 | A | 486.1 | 96.9 |
| Ti40Zr25Be30Cr5 | A | 465.4 | 97.5 |
| Ti40Zr25Ni8Cu9Be18 | A | 544.4 | 101.1 |
| Ti45Zr16Ni9Cu10Be20 | A | 523.1 | 104.2 |
| Vit 1 | A | 530.4 | 95.2 |
| Vit105 (Zr52.5Ti5Cu17.9Ni14.6Al10) | A | 474.4 | 88.5 |
| Vit 106 | A | 439.7 | 83.3 |
| Zr55Cu30Al10Ni5 | A | 520.8 | 87.2 |
| Zr65Cu17.5Al7.5Ni10 | A | 463.3 | 116.9 |
| DH1 | C | 391.1 | 84.7 |
| GHDT (Ti30Zr35Cu8.2Be26.8) | A | 461.8 | 90.5 |

Figure 5:
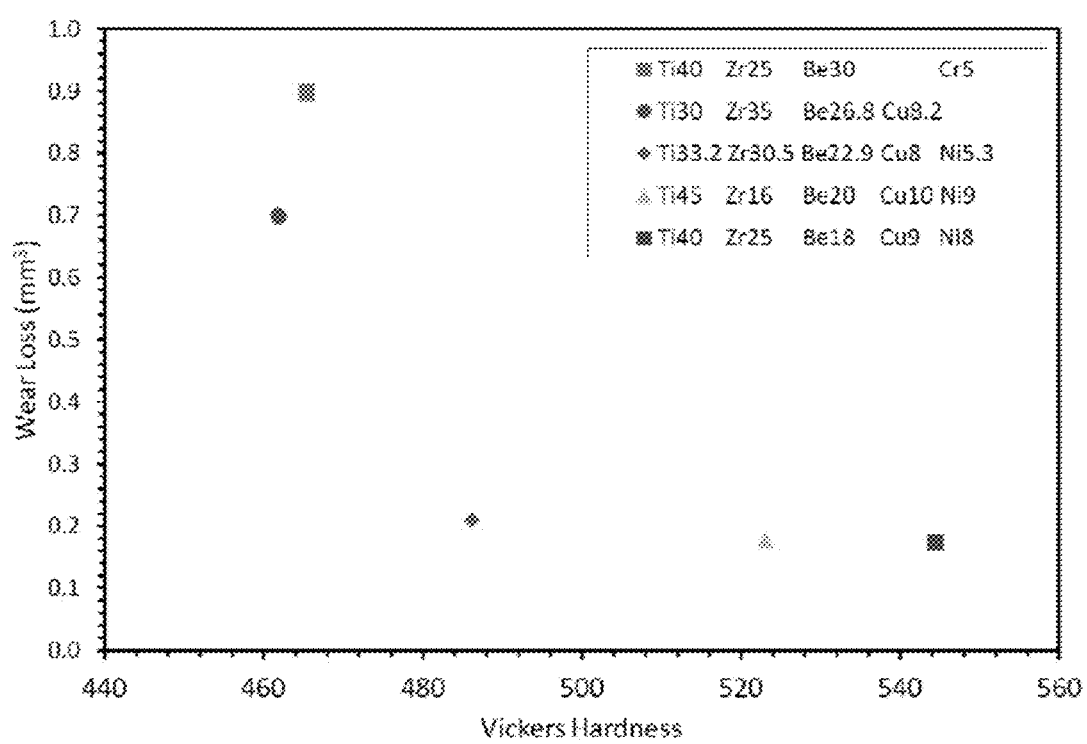
FIG. 5 illustrates the wear-resistance properties of titanium MG-based materials that can be implemented within strain wave gear components in accordance with certain embodiments of the invention.

FIG. 5 illustrates how the hardness of a titanium MG-based material varies in relation to the composition of the alloy. Generally, titanium MG-based alloys tend to possess a number of characteristics that make them particularly well-suited for the fabrication of strain wave gears and strain wave gear components. For example, such alloys can have relatively low densities, e.g. on the order of 4.5 g/cm$^3$. By contrast, many steel-based materials have densities on the order of 8 g/cm$^3$. Notably, crystalline Titanium based alloys may not be as suitable for implementation within strain wave gears, as many crystalline Titanium based alloys are characterized by: poor wear resistance, low hardness, and/or difficult machinability. Accordingly, by using titanium in the form of a metallic glass-based material, titanium can be viably implemented into strain wave gears and strain wave gearing components.

Tables 5 and 6 below list reported data as to how fatigue characteristics with MG-based materials vary as a function of composition.

TABLE 5

Fatigue Characteristics as a Function of Composition

| Material | Fracture Strength (MPa) | Geometry (mm) | Loading mode | Frequency (Hz) | R-ratio | Fatigue limit (MPa) | Fatigue ratio |
|---|---|---|---|---|---|---|---|
| $Zr_{56.2}Cu_{6.9}Ni_{5.6}Ti_{13.8}Nb_{5.0}Be_{12.5}$ Composites | 1480 | 3 × 3 × 30 | 4PB | 25 | 0.1 | ~296 | 0.200 |
| $Zr_{41.2}Cu_{12.5}Ni_{10}Ti_{13.8}Nb_{5.0}Be_{22.5}$ | 1900 | 3 × 3 × 50 | 4PB | 25 | 0.1 | ~152 | 0.080 |
| $Zr_{41.2}Cu_{12.5}Ni_{10}Ti_{13.8}Nb_{5.0}Be_{22.5}$ | 1900 | 2 × 2 × 60 | 3PB | 10 | 0.1 | 768 | 0.404 |
| $Zr_{41.2}Cu_{12.5}Ni_{10}Ti_{13.8}Nb_{5.0}Be_{22.5}$ | 1900 | 2 × 2 × 60 | 3PB | 10 | 0.1 | 359 | 0.189 |
| $Zr_{44}Ti_{11}Ni_{10}Cu_{10}Be_{25}$ | 1900 | 2.3 × 2.0 × 85 | 4PB | 5-20 | 0.3 | 550 | 0.289 |
| $Zr_{44}Ti_{11}Ni_{10}Cu_{10}Be_{25}$ | 1900 | 2.3 × 2.0 × 85 | 4PB | 5-20 | 0.3 | 390 | 0.205 |
| $Zr_{52.5}Cu_{17.9}Al_{10}Ni_{14.6}Ti_5$ | 1700 | 3.5 × 3.5 × 30 | 4PB | 10 | 0.1 | 850 | 0.500 |
| $(Zr_{58}Ni_{13.6}Cu_{18}Al_{10.4})_{99}Nb_1$ | 1700 | 2 × 2 × 25 | 4PB | 10 | 0.1 | 559 | 0.329 |
| $Zr_{55}Cu_{30}Ni_5Al_{10}$ | 1560 | 2 × 20 × 50 | Plate bend | 40 | 0.1 | 410 | 0.263 |

TABLE 6

Fatigue Characteristics as a Function of Composition

| Material | Fracture Strength (MPa) | Geometry (mm) | Loading mode | Frequency (Hz) | R-ratio | Fatigue limit (MPa) | Fatigue ratio |
|---|---|---|---|---|---|---|---|
| $Zr_{56.2}Cu_{6.9}Ni_{5.6}Ti_{13.8}Nb_{5.0}Be_{12.5}$ Composites | 1480 | Ø2.98 | TT | 10 | 0.1 | 239 | 0.161 |

TABLE 6-continued

Fatigue Characteristics as a Function of Composition

| Material | Fracture Strength (MPa) | Geometry (mm) | Loading mode | Frequency (Hz) | R-ratio | Fatigue limit (MPa) | Fatigue ratio |
|---|---|---|---|---|---|---|---|
| $Zr_{55}Cu_{30}Ni_5Al_{10}$ Nano | 1700 | 2 × 4 × 70 | TT | 10 | 0.1 | ~340 | 0.200 |
| $Zr_{41.2}Cu_{12.5}Ni_{10}Ti_{13.8}Nb_{5.0}Be_{22.5}$ | 1850 | Ø2.98 | TT | 10 | 0.1 | 703 | 0.380 |
| $Zr_{41.2}Cu_{12.5}Ni_{10}Ti_{13.8}Nb_{5.0}Be_{22.5}$ | 1850 | Ø2.98 | TT | 10 | 0.1 | 615 | 0.332 |
| $Zr_{41.2}Cu_{12.5}Ni_{10}Ti_{13.8}Nb_{5.0}Be_{22.5}$ | 1850 | Ø2.98 | TT | 10 | 0.1 | 567 | 0.306 |
| $Zr_{41.2}Cu_{12.5}Ni_{10}Ti_{13.8}Nb_{5.0}Be_{22.5}$ | 1900 | — | CC | 5 | 0.1 | ~1050 | 0.553 |
| $Zr_{41.2}Cu_{12.5}Ni_{10}Ti_{13.8}Nb_{5.0}Be_{22.5}$ | 1900 | — | TC | 5 | −1 | ~150 | 0.079 |
| $Zr_{50}Cu_{40}Al_{10}$ | 1821 | Ø2.98 | TT | 10 | 0.1 | 752 | 0.413 |
| $Zr_{50}Cu_{30}Al_{10}Ni_{10}$ | 1900 | Ø2.98 | TT | 10 | 0.1 | 865 | 0.455 |
| $Zr_{50}Cu_{37}Al_{10}Pd_3$ | 1899 | Ø2.98 | TT | 10 | 0.1 | 983 | 0.518 |
| $Zr_{50}Cu_{37}Al_{10}Pd_3$ | 1899 | Ø5.33 | TT | 10 | 0.1 | ~900 | 0.474 |
| $Zr_{52.5}Cu_{17.9}Al_{10}Ni_{14.6}Ti_5$ | 1660 | 6 × 3 × 1.5 | TT | 1 | 0.1 | — | — |
| $Zr_{52.5}Cu_{17.9}Al_{10}Ni_{14.6}Ti_5$ | 1700 | Ø2.98 | TT | 10 | 0.1 | 907 | 0.534 |
| $Zr_{59}Cu_{20}Al_{10}Ni_8Ti_3$ | 1580 | 6 × 3 × 1.5 | TT | 1 | 0.1 | — | — |
| $Zr_{65}Cu_{15}Al_{10}Ni_{10}$ | 1300 | 3 × 4 × 16 | TT | 20 | 0.1 | ~280 | 0.215 |
| $Zr_{55}Cu_{30}Al_{10}Ni_5$ | 1560 | 1 × 2 × 5 | TT | 0.13 | 0.5 | — | — |

Figure 4A:
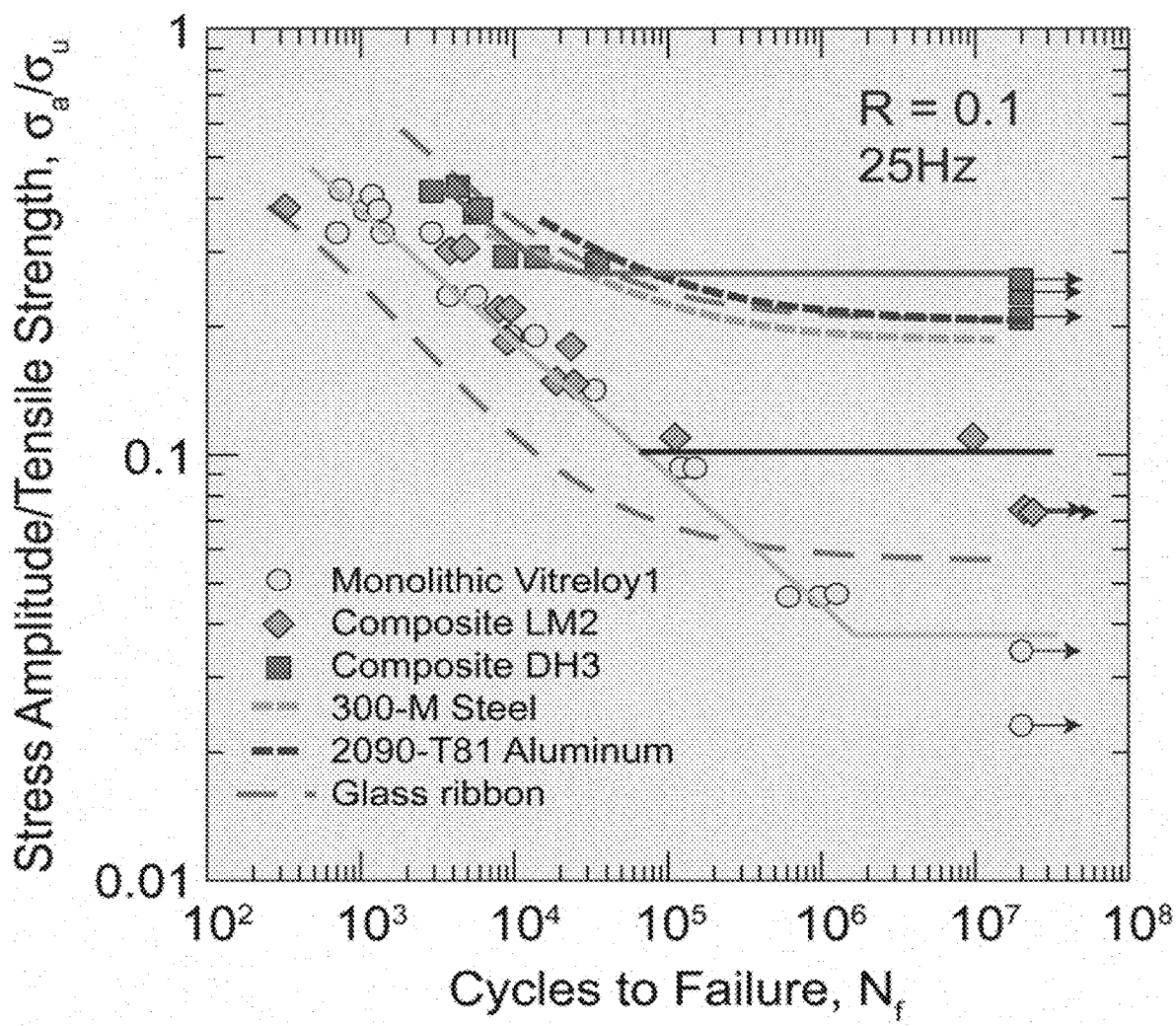
FIGS. 4A-4B illustrate the fatigue properties of MG-based materials that can be implemented within strain wave gear components in accordance with certain embodiments of the invention.
Figure 4B:
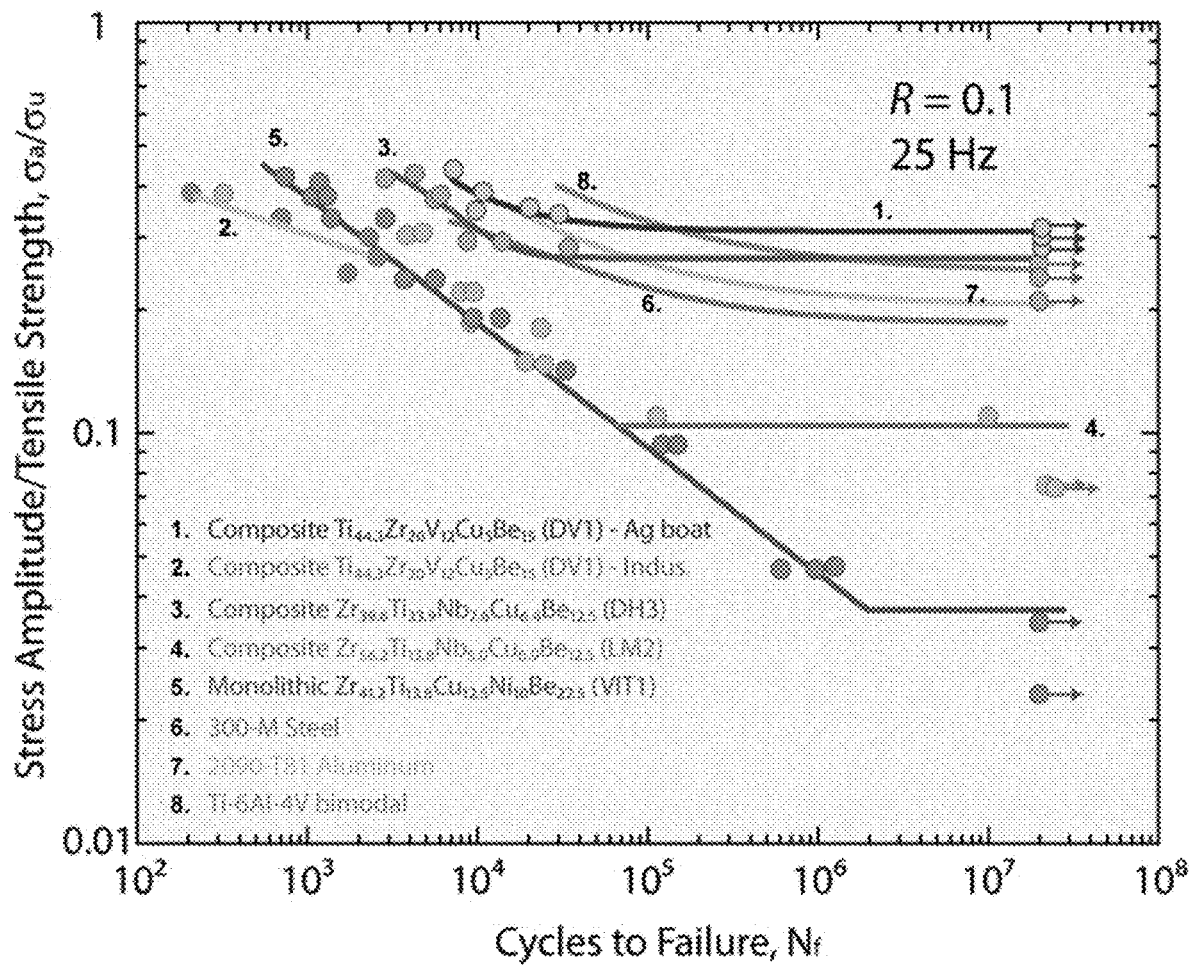

Although the data in tables 5 and 6 has been reported, one of the inventors of the instant application conducted independent fatigue tests, which to some extent contradict the reported values. FIGS. 4A and 4B depict the results of the conducted tests.

In particular, FIG. 4A illustrates the fatigue resistance of Monolithic Vitreloyl, Composite LM2, Composite DH3, 300-M Steel, 2090-T81 Aluminum, and Glass Ribbon. From these results, it is demonstrated that Composite DH3 exhibits a high resistance to fatigue failure. For example, Composite DH3 shows that it can survive approximately 20,000,000 cycles at a stress amplitude/tensile strength ratio of about 0.25. Note that monolithic Vitreloy 1 shows relatively poor resistance to fatigue failure, which appears to contravene the results shown in Tables 5 and 6. This discrepancy may be in part due to the rigor under which the data was obtained. In particular, as the inventor of the instant application realized that resistance to fatigue is a critical material property in determining suitability for various applications, he obtained fatigue resistance data that was procured under the most stringent testing conditions. FIG. 4A is reproduced from Launey, PNAS, Vol. 106, No. 13, 4986-4991, the disclosure of which is hereby incorporated by reference (and of which the one of the instant Inventors is a listed coauthor).

Similarly, FIG. 4B illustrates the fatigue resistance of DV1 ('Ag boat'—i.e., manufactured using semisolid processing), DV1 ('indus.'—manufactured using industry standard procedures), Composite DH3, Composite LM2, Monolithic Vitreloyl, 300-M Steel, 2090-T81 Aluminum, and Ti-6Al-4V bimodal. These results indicate that Composite DV1 (Ag boat) exhibits even greater resistance to fatigue failure than Composite DH3. Note that the results of the Composite DV1 testing varied greatly based on how the Composite DV1 was manufactured. When it was manufactured using 'Pkg boat' techniques ('Ag boat' refers to semisolid manufacturing techniques, which are described in Hofmann, JOM, Vol. 61, No. 12, 11-17, the disclosure of which is hereby incorporated by reference.), it displayed far superior resistance to fatigue as compared to when it was manufactured using industry standard techniques. The inventors of the instant application believe that this discrepancy is due to the fact that industry standard manufacturing processes do not provide the type of rigor necessary to produce sufficiently pure materials, and this may be a function of the industry not recognizing how critical material composition is in determining material properties, including resistance to fatigue failure. FIG. 4B was produced by Launey in a collaboration that resulted in FIG. 4A, but FIG. 4B was not published in the above-cited article.

In general, FIGS. 4A and 4B indicate that MG-based materials can be developed to have better fatigue characteristics than steel and other heritage engineering materials. Importantly, FIGS. 4A and 4B depict relative stress amplitude ratios, and as can be gleaned from table 1, MG-based materials can be made to possess greater ultimate tensile strengths than many steels. Thus, MG-based materials can be made to withstand more loading cycles at higher stress levels than some steels. Moreover, as MG-based materials can be made to be less stiff, they can be made to experience less stress per unit deflection, which can thereby result in even greater fatigue performance.

From the above, it is clear that MG-based materials can possess advantageous materials properties that can make them very well-suited for implementation within strain wave gear components. Any of the listed MG-based materials can be implemented within strain wave gear components in accordance with certain embodiments of the invention. More generally, MG-based materials can be tailored (e.g. via alloying and/or heat treating) to obtain a material having the desired materials profile for implementation within a strain wave gear in accordance with embodiments of the invention. Generally, a desired material property profile can be determined for a respective strain wave gear component, and a MG-based material conforming to the material property profile can be developed and implemented.

For example, in many embodiments where a less stiff material is desired, the relative ratios of B, Si, Al, Cr, Co, and/or Fe within a MG-based composition is reduced. Similarly, in many embodiments where a less stiff material is desired, the volume fraction of soft, ductile dendrites is increased; or alternatively, the amount of beta stabilizing elements, e.g. V, Nb, Ta, Mo, and/or Sn, are increased. Generally, in metallic glass matrix composites, the stiffness of a material changes in accordance with the rule of mixtures, e.g., where there are relatively more dendrites, the stiffness decreases, and where there are relatively less dendrites, the stiffness increases. Note that, generally speaking, when modifying the stiffness of MG-based materials, the stiffness is modified largely without overly influencing other properties, e.g. elastic strain limit or the processability of the MG-based material. The ability to tune the stiffness independent of other material properties or influencing processability is greatly advantageous in designing strain wave gears and strain wave gear components.

Moreover, just as the stiffness of MG-based materials can be tuned, the resistance to fatigue failure can also be tuned in accordance with embodiments of the invention. The alloying elements used to improve resistance to fatigue failure are largely experimentally determined. However, it has been observed that the same processing techniques that are used to enhance fracture toughness also tend to beneficially influence resistance to fatigue failure. More generally, any of a variety of materials characteristics can be altered by appropriately alloying base materials. For instance, the hardness, toughness, fatigue life, corrosion resistance, etc., can be modified by appropriate alloying. In many instances, these characteristics can be independently tuned. This can enable great customizability for parts to be fabricated.

In any case, as should be clear from the above, any of the above-listed and described MG-based materials can be incorporated within strain wave gears and strain wave gear components in accordance with embodiments of the invention. More generally, any MG-based material can be implemented within strain wave gears and strain wave gear components in accordance with embodiments of the invention. For example, in many embodiments the implemented MG-based material is based in Fe, Zr, Ti, Ni, Hf, or Cu (i.e. those respective elements are present in the material in greater amounts than any other element). In some embodiments, a MG-based material that is implemented within a strain wave gear component is a Cu—Zr—Al—X composition, where X can be one or more element, including for example: Y, Be, Ag, Co, Fe, Cr, C, Si, B, Mo, Ta, Ti, V, Nb, Ni, P, Zn, and Pd. In several embodiments, a MG-based material that is implemented within a strain wave gear component is a Ni—Zr—Ti—X composition, where X can be one or more element, including for example Co, Al, Cu, B, P, Si, Be, and Fe. In a number of embodiments, a MG-based material that is implemented within a strain wave gear component is a Zr—Ti—Be—X composition, where X can be one or more element, including for example Y, Be, Ag, Co, Fe, Cr, C, Si, B, Mo, Ta, Ti, V, Nb, Ni, P, Zn, and Pd. In some embodiments, a strain wave gear component includes a MG-based material that is $Ni_{40}Zr_{28.5}Ti_{16.5}Al_{10}Cu_5$ (atomic percent). In several embodiments a strain wave gear component includes a MG-based material that is $(Cu_{50}Zr_{50})_xAl_{1-12}Be_{1-20}Co_{0.5-5}$. In many embodiments, a desired materials profile is determined for a given strain wave gear component, and a MG-based material that possess the desired characteristics is used to construct the strain wave gear component. As MG-based materials can possess many advantageous traits, their implementation within strain wave gear components can result in much more robust strain wave gears. The design methodology and fabrication of MG-based strain wave gears is now discussed in greater detail below.

Fabrication of Metallic Glass-Based Strain Wave Gears and Strain Wave Gear Components In many embodiments of the invention, strain wave gear components are fabricated from MG-based materials using casting or thermoplastic forming techniques. Using casting or thermoplastic forming techniques can greatly enhance the efficiency by which strain wave gears and strain wave gear components are fabricated. For example, steel-based strain wave gear components are typically machined; because of the intricacy of the constituent components, the machining costs can be fairly expensive. By contrast, using casting or thermoplastic forming techniques in the development of strain wave gear components can circumvent excessive costly machining processes.

Figure 6:
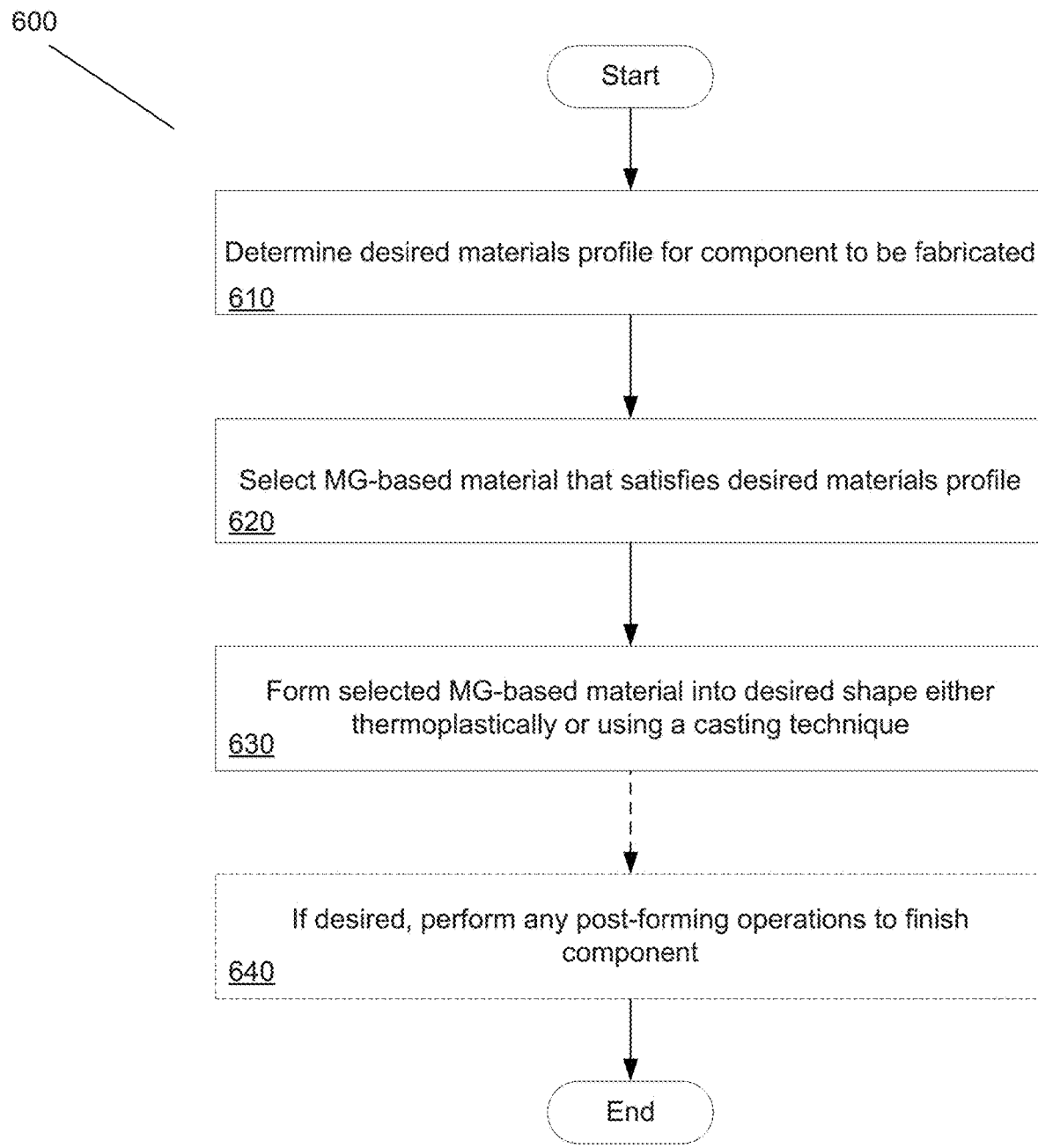
FIG. 6 illustrates a method of forming a MG-based strain wave gear component in accordance with certain embodiments of the invention.

A method of fabricating a strain wave gear component that incorporates casting or thermoplastic forming techniques is illustrated in FIG. 6. The process includes determining 610 a desired materials profile for the component to be fabricated. For example, where a flexspline is to be fabricated, it may be desired that the constituent material have a certain stiffness, a certain resistance to fatigue failure, a certain density, a certain resistance to brittle failure, a certain resistance to corrosion, a certain resistance to wear, a certain level of glass-forming ability, etc. In many embodiments, material costs are also accounted for (e.g. certain MG-based may be more or less expensive than other MG-based materials). Generally, any parameters can be accounted for in determining 610 the materials profile for the component to be fabricated.

Note that any constituent component of a strain wave gear can be fabricated in accordance with embodiments of the invention. As alluded to above, because the flexspline and the ball bearing are subject to periodic deformation, it may be particularly advantageous that they be formed from a material having a high resistance to fatigue failure. Moreover, flexsplines and ball bearings may also benefit from being formed from a material that possesses excellent resistance to wear, since those components experience constant contact and relative motion during the normal operation of a strain wave gear (the gear teeth of the flexspline are subject to wear and the balls and inner and outer races of the ball bearing may experience wear). In some embodiments the balls of the ball bearing are fabricated from MG-based materials—in this way, the balls of the ball bearing can benefit from the enhanced wear resistance that MG-based materials can offer.

But it should be clear that any of the components of a strain wave gear can be fabricated from MG-based materials in accordance with embodiments of the invention. In some embodiments, the gear teeth of the circular spline are fabricated from MG-based materials. In this way, the gear teeth of the circular spline can benefit from the enhanced wear-performance characteristics that MG-based materials can offer. In some embodiments, the gear teeth of the circular spline that are fabricated from a MG-based material are thereafter press-fit into a different, stiffer material—for example beryllium and titanium—to form the circular spline, bearing in mind that it would be beneficial for the circular spline to be relatively rigid to support the motion of the flexspline and the wave generator. In this way, MG-based materials are implemented in the gear teeth of the circular spline where they can offer enhanced wear performance, and a stiffer material can form the remainder of the circular spline where it can offer enhanced structural support.

In many embodiments, the majority of the constituent components of a strain wave gear are fabricated from the same MG-based materials—in this way, the respective strain wave gear can have a more uniform coefficient of thermal expansion. In any case, it should be clear that any of the constituent components of a strain wave gear can be fabricated from a MG-based material in accordance with embodiments of the invention.

Returning to FIG. 6, a MG-based material is selected 620 that satisfies the determined materials profile. Any suitable MG-based material can be selected, including any of those listed above in Tables 1-5, and depicted in FIGS. 4A-4B and 5. In many embodiments, MG-based materials are particularly developed to satisfy the determined 610 materials profile, and are thereby selected 620. For example, in many embodiments, given MG-based materials are developed by alloying (e.g. as discussed above) in any suitable way to tweak the materials properties. In a number of embodiments, a MG-based material is developed by modifying the ratio of crystalline structure to amorphous structure (e.g. as discussed above) to tweak the materials properties. Of course, any suitable way of developing MG-based materials that satisfy the determined 610 materials properties may be implemented in accordance with embodiments of the invention.

Figure 7A:
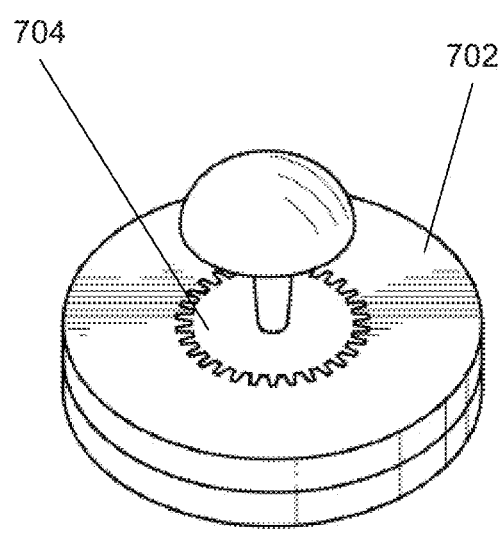
FIGS. 7A-7D illustrate the formation of a gear using casting techniques in accordance with certain embodiments of the invention.
Figure 7B:
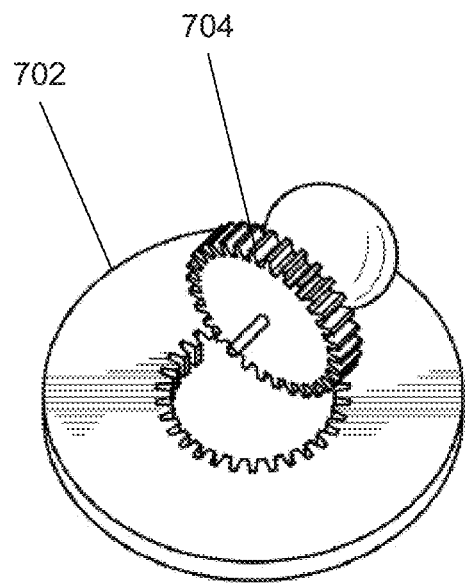
Figure 7C:
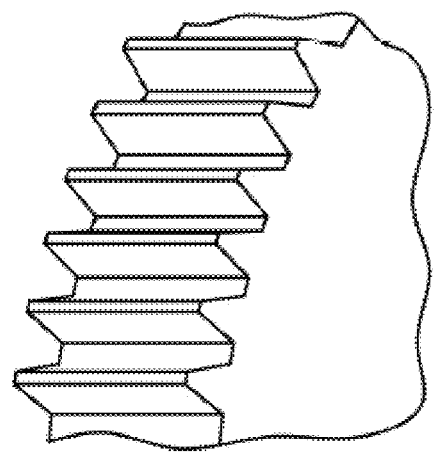
Figure 7D:
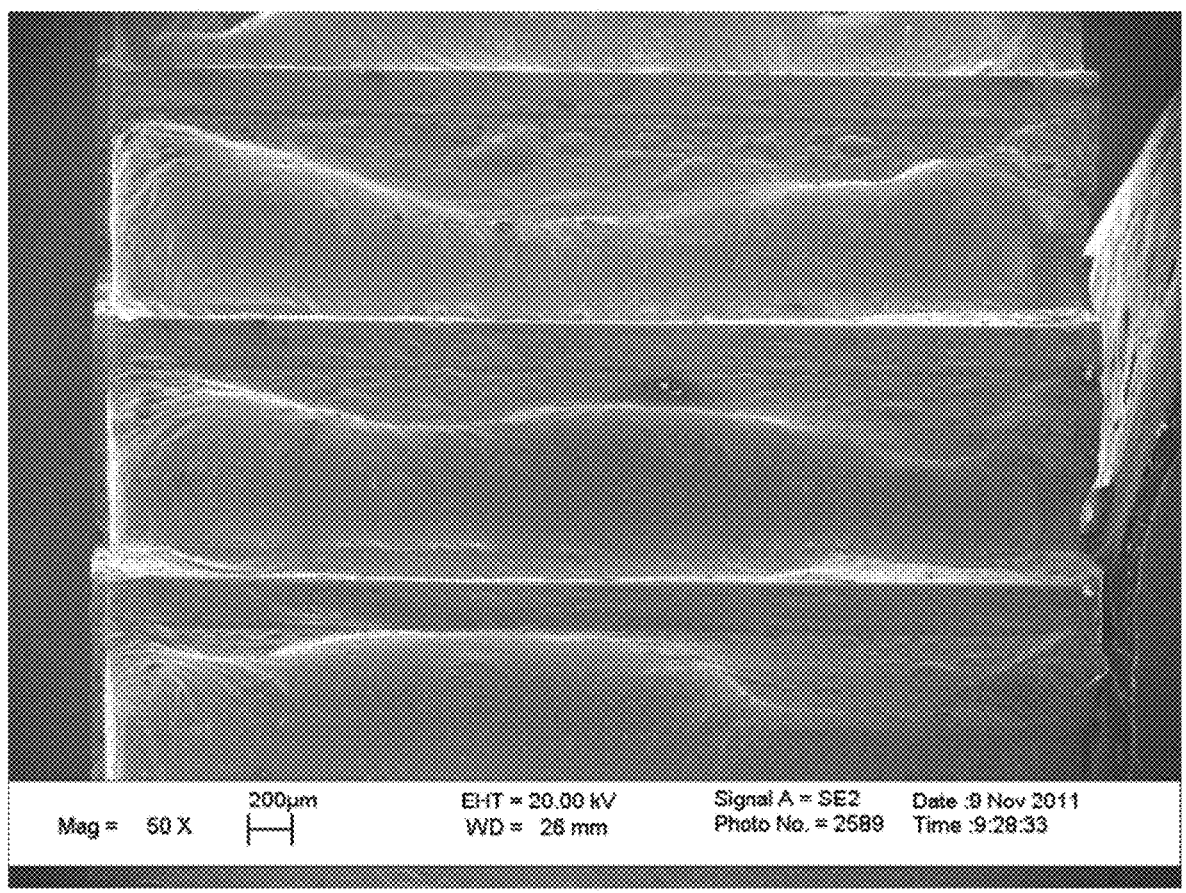

The selected 620 MG-based material is formed into the desired shape (e.g. the shape of the component to be fabricated), for example thermoplastically or using a casting technique. While the fabrication of gear-type components from MG-based materials via casting and/or thermoplastic techniques is not currently widespread, the inventors of the instant application have demonstrated the viability of such techniques for this purpose. For example, FIGS. 7A-7D schematically illustrate a gear having a 1 inch radius that had been fabricated from a MG-based material using a single casting step. In particular, FIG. 7A illustrates the steel mold 702 that was used in the formation of the gear. FIG. 7B illustrates removal of the metallic glass matrix composite material 704 from the steel mold 702. FIG. 7C is a reproduction of an SEM image that was taken of the fabricated gear. FIG. 7D depicts an SEM image demonstrating the fidelity of the fabricated component. Notably, the gear teeth were also implemented using this method of fabrication. In this way, the intricate and expensive machining of the gear teeth can be avoided (by contrast, steel-based strain wave gear components typically rely on machining in the formation of the component). Thus, in accordance with this teaching, in many embodiments, MG-based materials are thermoplastically formed or cast into the shapes of the constituent components of a strain wave gear. In many embodiments, MG-based materials are thermoplastically formed or cast into the shapes of the constituent components including the shapes of the gear teeth. Note also that any suitable thermoplastic forming or casting technique can be implemented in accordance with embodiments of the invention. For example, the constituent components of a strain wave gear can be formed by one of: a direct casting technique, a forging technique, a spin forming technique, a blow molding technique, a centrifugal casting technique, a thermoplastic forming technique using MG-based powder, etc. As one of ordinary skill in the art would appreciate, the MG based material must be cooled sufficiently rapidly to maintain at least some amorphous structure. Of course it should be noted that strain wave gear components can be formed from MG-based materials in any suitable manner, including by machining, in accordance with embodiments of the invention.

Figure 8A:
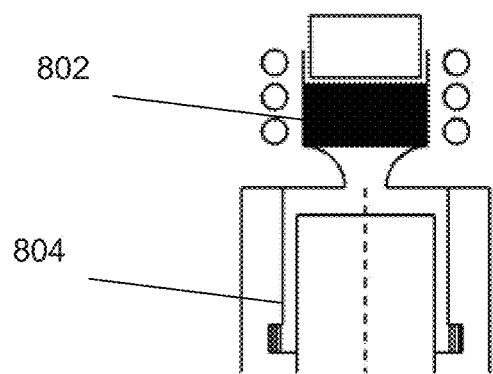
FIGS. 8A-8D illustrate the fabrication of a strain wave gear component using a casting technique in accordance with certain embodiments of the invention.
Figure 8B:
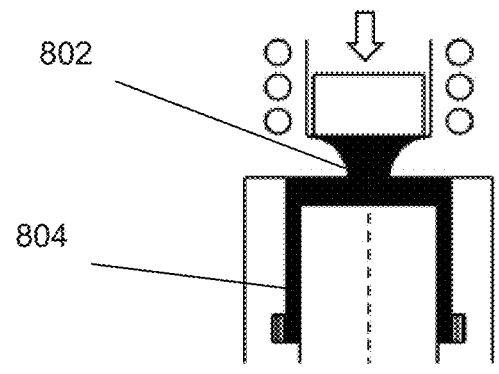
Figure 8C:
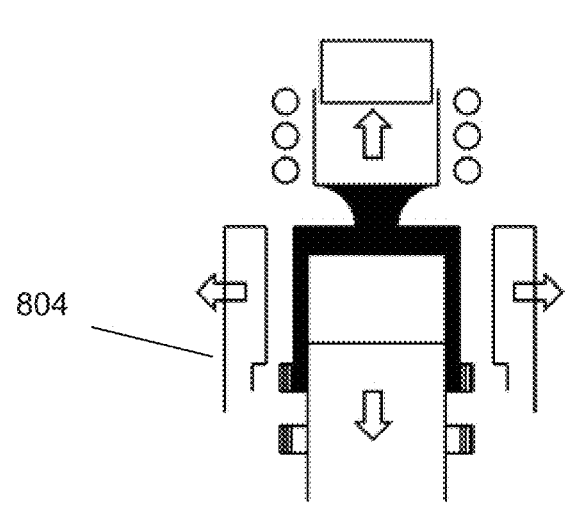
Figure 8D:
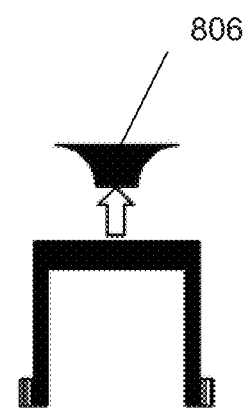

As an example, FIGS. 8A-8D illustrate a direct casting technique that can be implemented to form a constituent component of a strain wave gear in accordance with embodiments of the invention. In particular, FIG. 8A depicts that a molten MG-based material 802 that has been heated to a molten state and is thereby ready to be inserted into a mold 804. The mold 804 helps define the shape of the component to be formed. FIG. 8B depicts that the molten MG-based material 802 is pressed into the mold 804. FIG. 8C depicts that the mold 804 is released after the MG-based material has cooled. FIG. 8D depicts that any excess flash 806 is removed. Thus, it is depicted that a strain wave gear component can be fabricated using direct casting techniques in conjunction with a MG-based material in accordance with embodiments of the invention. Note that it is generally not feasible to cast crystalline metals that are suitable for implementation within strain wave gear components.

Figure 9A:
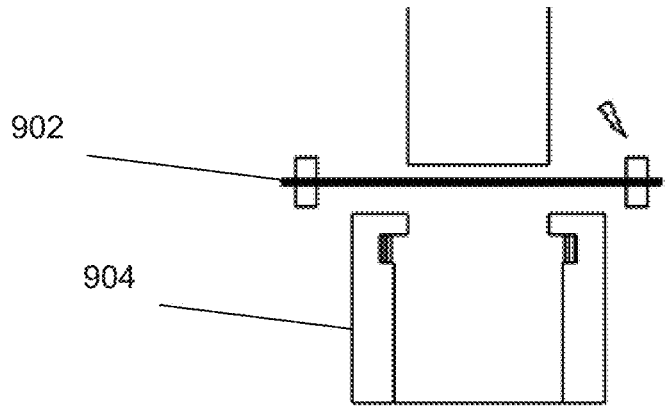
FIGS. 9A-9C illustrate the fabrication of a strain wave gear component using a MG-based material in the form of a sheet in conjunction with a thermoplastic forming technique in accordance with certain embodiments of the invention.
Figure 9B:
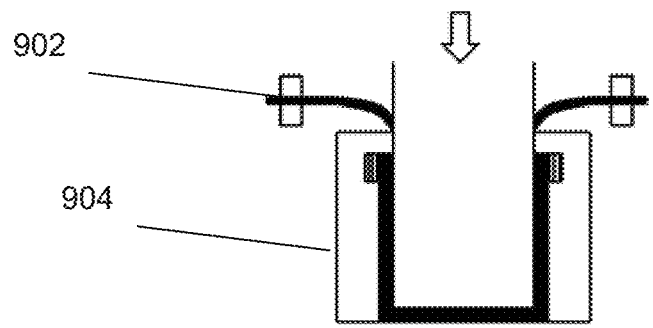
Figure 9C:
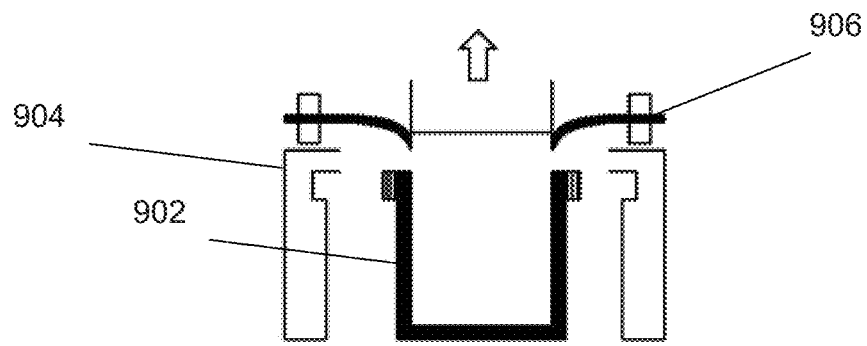

FIGS. 9A-9C illustrate another forming technique that can be implemented in accordance with embodiments of the invention. In particular, FIGS. 9A-9C illustrate the thermoplastic forming of a MG-based material that is in the form of a sheet in accordance with embodiments of the invention. Specifically, FIG. 9A depicts that a sheet of MG-based material 902 that has been heated such that thermoplastic forming can be implemented. In the illustrated embodiment, the sheet of MG-based material 902 is heated via a capacitive discharge technique, but it should be understood that any suitable method of heating can be implemented in accordance with embodiments of the invention. FIG. 9B depicts that a press is used to force the MG-based material into the mold 904 to form the component to be fabricated. FIG. 9C depicts that the mold 904 is released and any excess flash 906 is removed. Thus, the desired component is achieved.

Figure 10A:
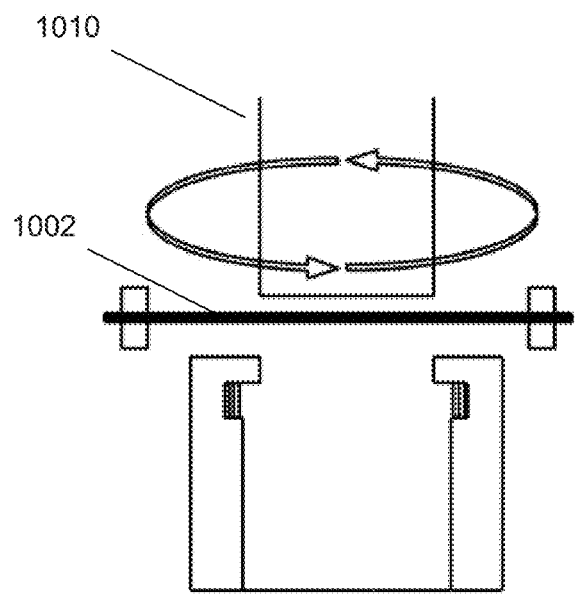
FIGS. 10A-10C illustrate the fabrication of a strain wave gear component using a spin forming technique in accordance with certain embodiments of the invention.
Figure 10B:
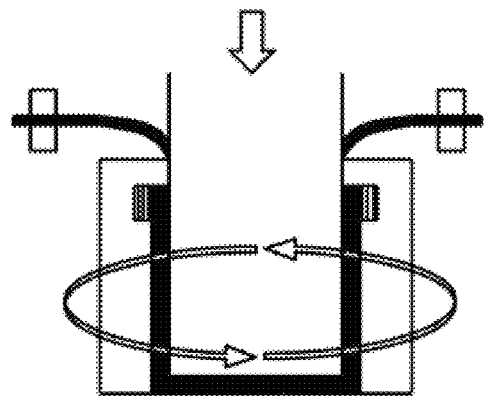
Figure 10C:
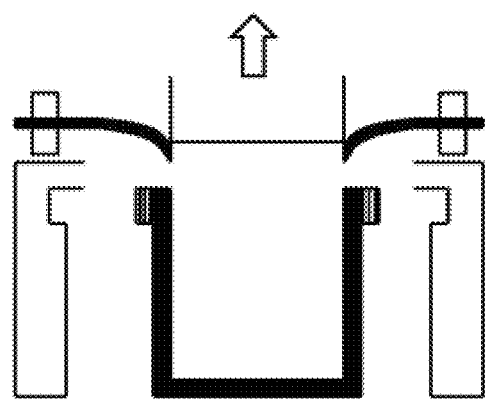

As mentioned above, the heating of the MG-based material so that it is capable of thermoplastic forming can be achieved in any suitable way in accordance with embodiments of the invention. For example, FIGS. 10A-10C depict that the heating of MG-based material in the form of a sheet can be accomplished by spinning friction. FIGS. 10A-10C are similar to those seen in FIGS. 9A-9C except that the MG-based sheet material is heated frictionally by the rotation of the press 1010 as it is pressed against the MG-based material 1002. In this way, the MG-based material can be heated to an extent that it can be thermoplastically formed. This technique has been referred to as 'spin forming.'

Note that although the above descriptions regard mechanically conforming MG-based material to mold, MG-based material can be formed into a mold in any suitable way in accordance with embodiments of the invention. In many embodiments, the MG-based material is made to conform to the mold using one of: a forging technique, a vacuum-based technique, a squeezing technique, and a magnetic forming technique. Of course, the MG-based material can be made to conform to a mold in any suitable fashion in accordance with embodiments of the invention.

Figure 11A:
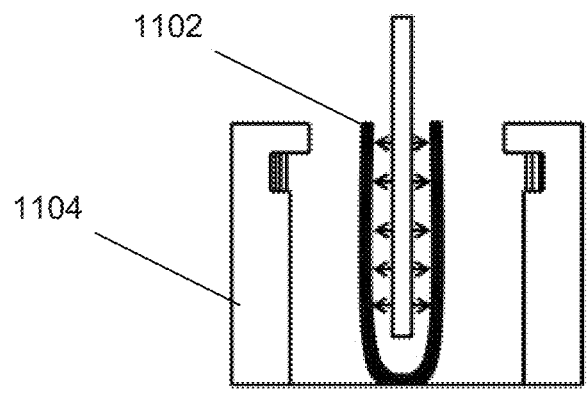
FIGS. 11A-11C illustrate the fabrication of a strain wave gear component using a blow molding technique in accordance with certain embodiments of the invention.
Figure 11B:
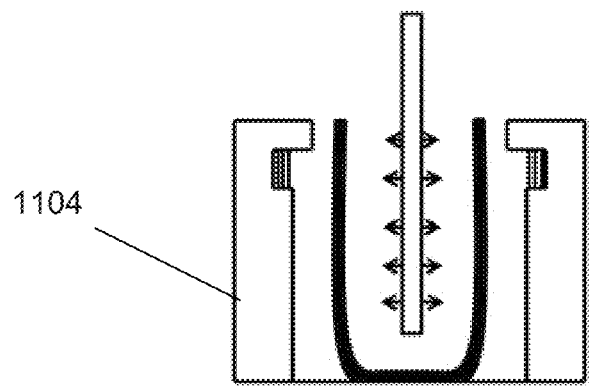
Figure 11C:
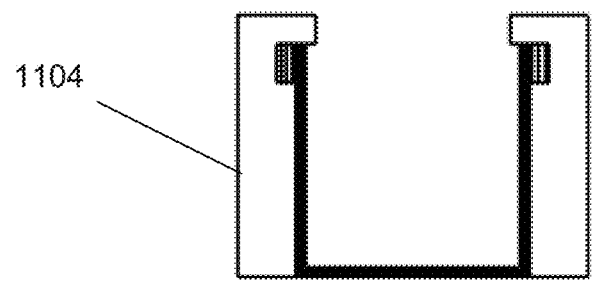

FIGS. 11A-11C depict the forming a part using blow molding techniques. In particular, FIG. 11A depicts that a MG-based material is placed within a mold. FIG. 11B depicts that the MG-based material 1102 is exposed to pressurized gas or liquid that forces the MG-based material to conform to the shape of the mold 1104. Typically, a pressurized inert gas is used. As before, the MG-based material 1102 is usually heated so that it is sufficiently pliable and can be influenced by the pressurized gas or liquid. Again, any suitable heating technique can be implemented in accordance with embodiments of the invention. FIG. 11C depicts that due to the force of the pressurized gas or liquid, the MG-based material conforms to the shape of the mold 1104.

Figure 12A:
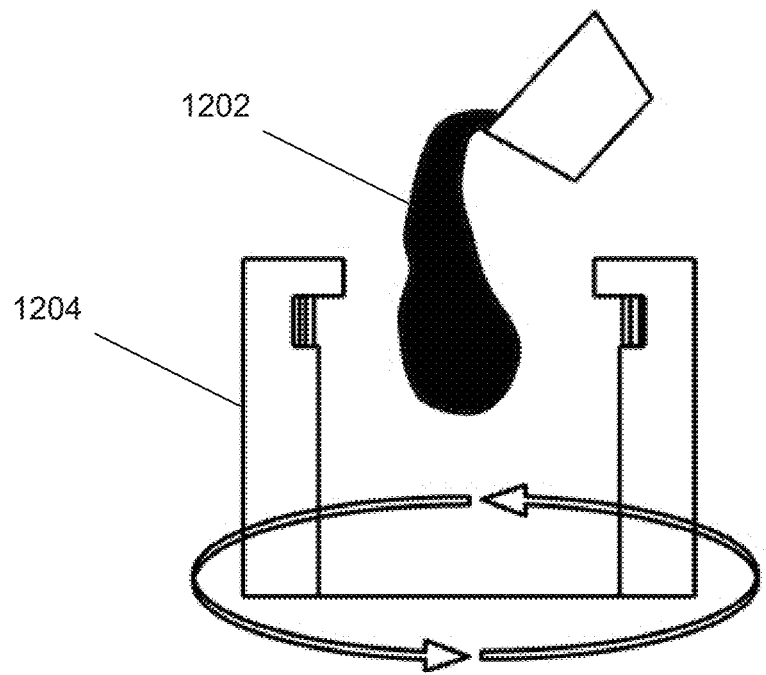
FIGS. 12A-12B illustrate using centrifugal casting to form a strain wave gear component in accordance with certain embodiments of the invention.
Figure 12B:
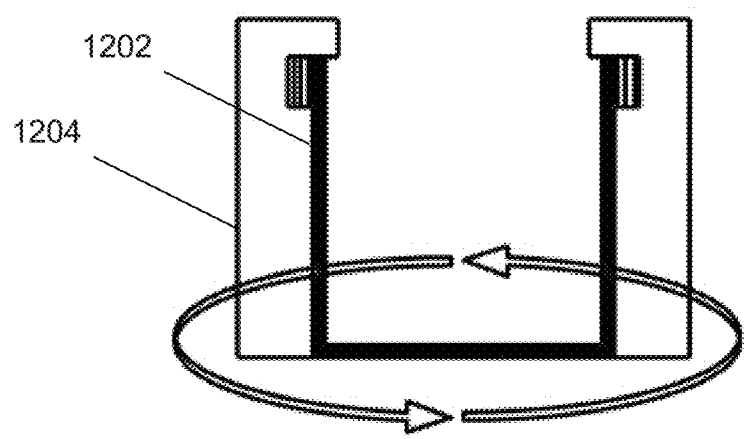

FIGS. 12A and 12B depict that centrifugal casting can be implemented to form the constituent component of the strain wave gear. In particular, FIG. 12A depicts that molten MG-based material 1202 is poured into a mold 1204, and that the mold is rotated so that the molten MG-based material conforms to the shape of the mold.

Figure 13A:
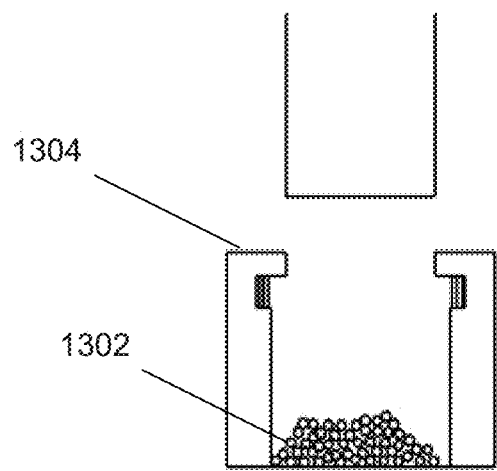
FIGS. 13A-13C illustrate forming a strain wave gear component by thermoplastically forming MG-based material in the form of powder in accordance with certain embodiments of the invention.
Figure 13B:
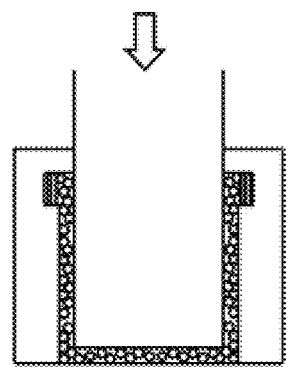
Figure 13C:
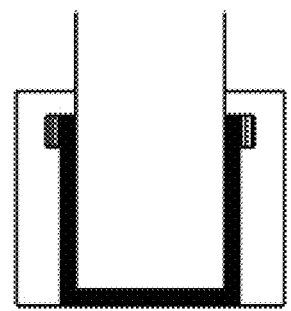

FIGS. 13A-13C depict that MG-based material can be inserted into a mold in the form of powder, subsequently heated so that the material is thermoplastically formable, and thereby made to form the shape of the desired constituent component in accordance with embodiments of the invention. In particular, FIG. 13A depicts that MG-based material in the form of powder 1302 is deposited within a mold. FIG. 13B depicts that the MG-based material 1302 is heated and pressed so as to conform to the shape of the mold 1304. And FIG. 13C depicts that the MG-based material has solidified and thereby formed the desired component.

In general, it should be clear that any suitable technique for thermoplastically forming or casting the MG-based material can be implemented in accordance with embodiments of the invention. The above-described examples are meant to be illustrative and not comprehensive. Even more generally, any suitable technique for forming a strain wave gear component that constitutes a MG-based material can be implemented in accordance with embodiments of the invention.

Figure 14:
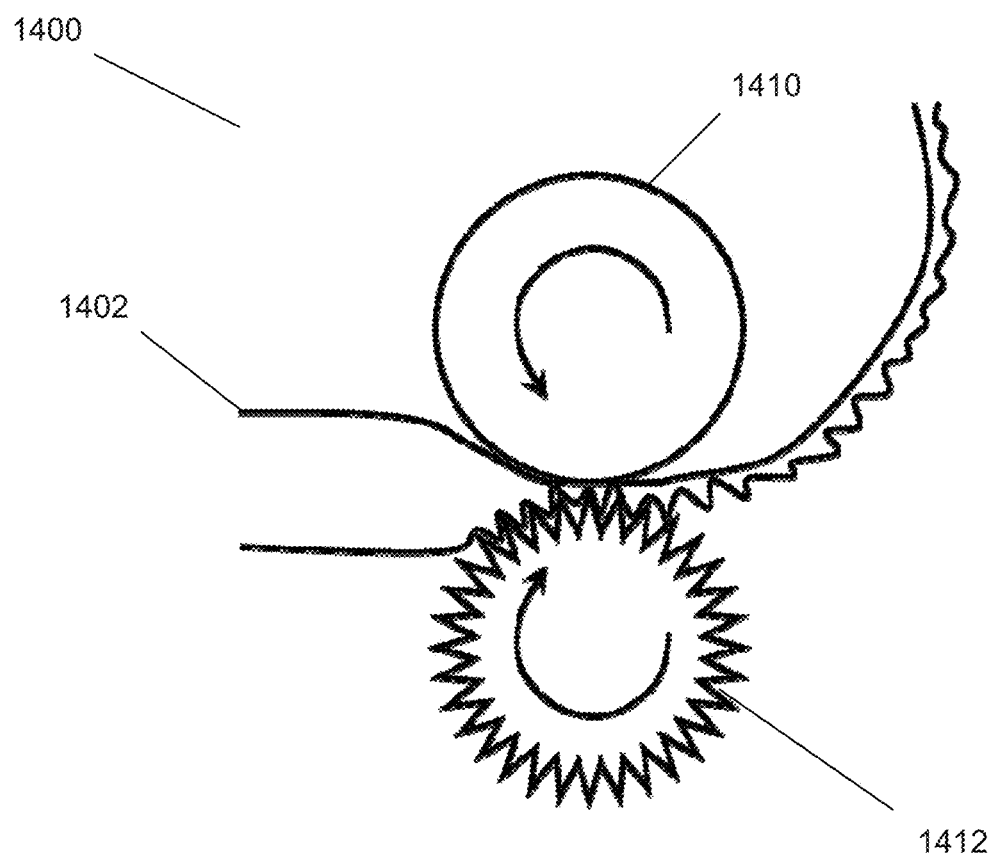
FIG. 14 illustrates using twin roll forming to implement gear teeth onto a MG-based strain wave gear component in accordance with certain embodiments of the invention.

Referring back to FIG. 6, the process 600 further includes, if desired, performing 640 any post-forming operations to finish the fabricated component. For example, in some embodiments, the general shape of a flexspline is thermoplastically formed or cast, and gear teeth are subsequently machined onto the flexspline. In some embodiments a twin-roll forming technique is implemented to install gear teeth onto a flexspline or a circular spline. FIG. 14 depicts a twin roll forming arrangement that can be used to implement gear teeth onto a flexspline. In particular, the arrangement 1400 includes a first roller that supports the motion of a flexspline 1402 through the arrangement, and a second roller 1412 that acts to define the gear teeth onto the flexspline. The flex spline 1402 can be heated so that it is more pliable and ready to be defined by the second roller. Of course, the formed part can be finished using any suitable technique in accordance with embodiments of the invention. For example, gear teeth can be implemented using traditional machining techniques. Additionally, the formed part can be finished in any suitable way—not just to define gear teeth—in accordance with embodiments of the invention.

Figure 15A:
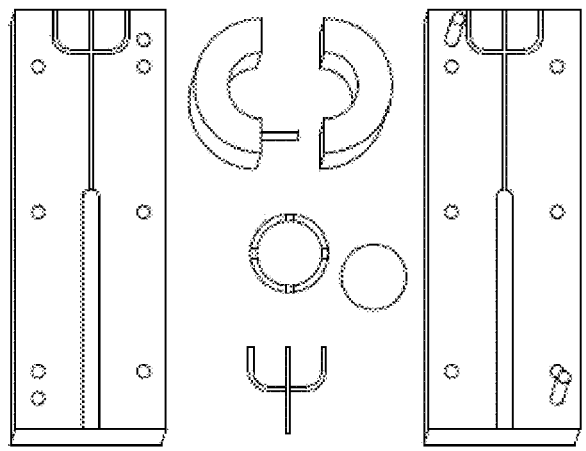
Figure 15B:
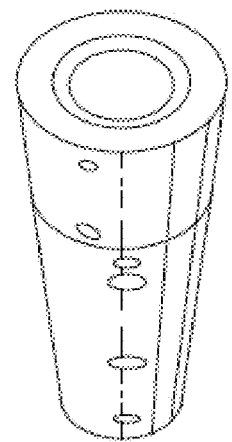
Figure 15C:
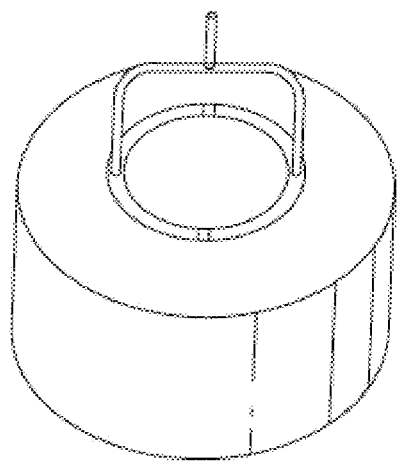
Figure 15D:
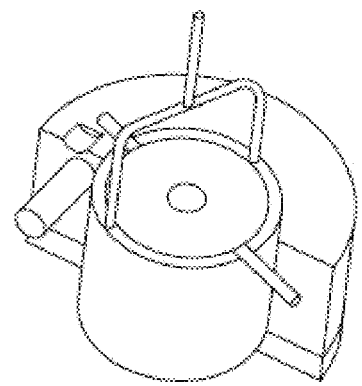

FIGS. 15A-15F illustrate the fabrication of a flexspline in accordance with the process outlined in FIG. 6. In particular: FIG. 15A depicts a multi-piece mold that is used to cast the general shape of the flexspline; FIG. 15B depicts the assembled multi-piece mold that is used to cast the general shape of the flexspline; FIG. 15C illustrates the casting of the flexspline using MG-based material; FIG. 15D illustrates the disassembling the mold; FIG. 15E illustrates the flexspline as it has been removed from the mold; and FIG. 15F illustrates that a flexspline can be machined to include gear teeth after being cast from a MG-based material. Bear in mind that although the illustration depicts that gear teeth are machined onto the flexspline, the flexspline could have been cast to include the desired gear teeth. In this way, costly machining processes can be avoided.

Figure 16:
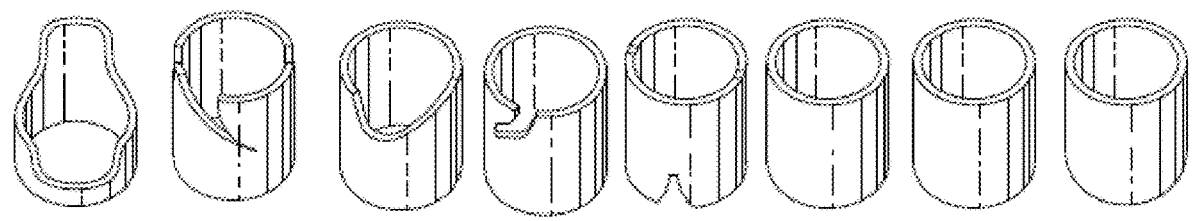
FIG. 16 illustrate that casting processes should be well-controlled in fabricating a strain wave gear component in accordance with certain embodiments of the invention.

Note that the formation techniques are extremely sensitive to process control. In general, it is beneficial to have precise control over the fluid flow, venting, temperature, and cooling when forming the part. For example, FIG. 16 schematically illustrates several attempts at forming the flexspline using a casting technique, and many of the attempts are clearly imperfect. In particular, the 7 samples to the left of the image were fabricated using a TiZrCuBe MG-based material having a density of 5.3 g/cm$^3$. The right-most sample in the image was fabricated from Vitreloy 1.

Figure 17:
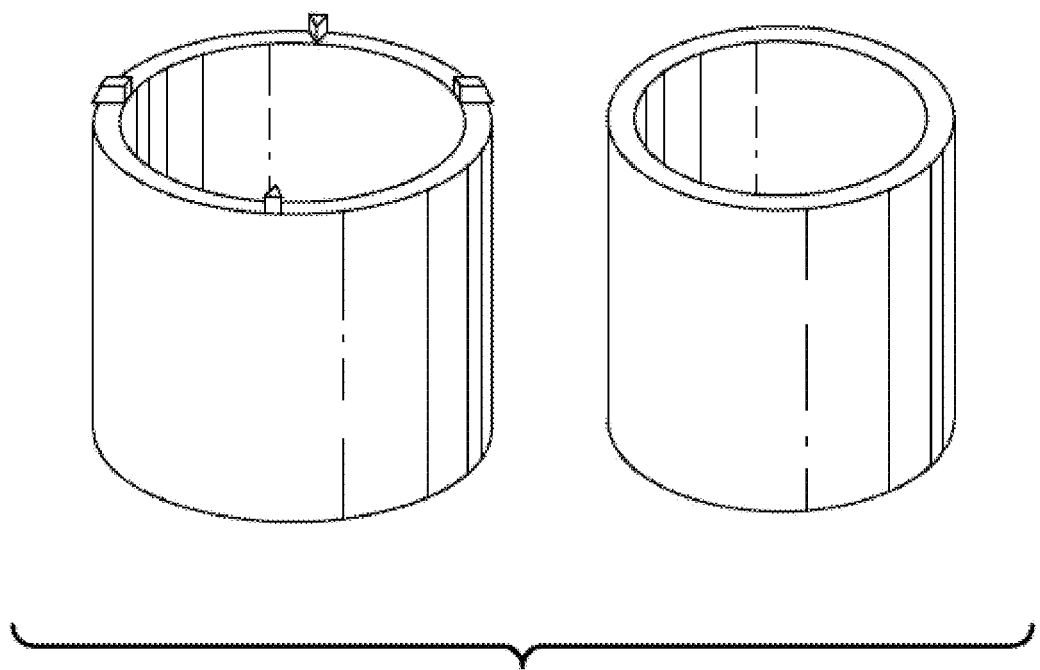
FIG. 17 illustrates that strain wave gear components can be fabricated on any suitable scale in accordance with certain embodiments of the invention.

FIG. 17 illustrates that the above-described processes can be used to create parts of varying scale. As an example, FIG. 17 illustrates a larger flexspline fabricated in accordance with the above-described processes, as well as a smaller flexspline fabricated in accordance with the above-described processes. In this way, the above-described processes are versatile.

Figure 18A:
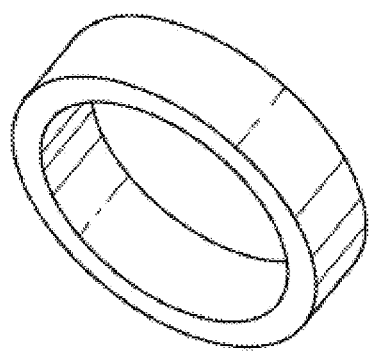
FIGS. 18A-18B illustrate the fabrication of a circular spline in accordance with certain embodiments of the invention.
Figure 18B:
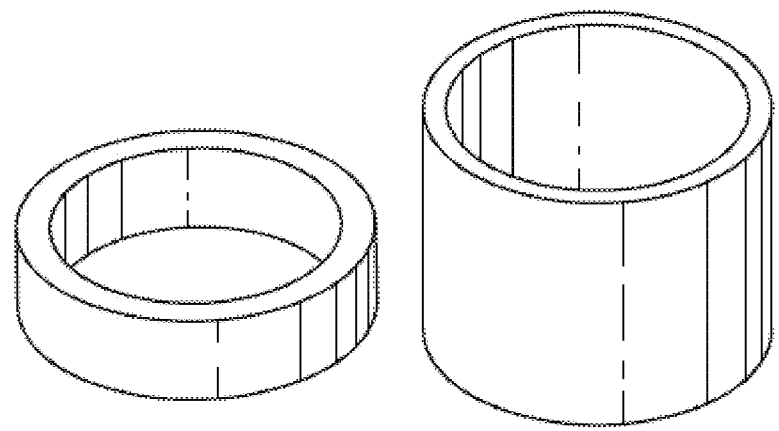

It should be understood that although FIGS. 15-17 regard the fabrication of a flexspline, any strain wave gear component can be fabricated from a MG-based material in accordance with embodiments of the invention. For example, FIGS. 18A-18B illustrate a circular spline that has been fabricated from a MG-based material. Specifically, FIG. 18A illustrates a titanium MG-based material that has been formed into a 1.5" circular spline; FIG. 18B depicts the fabricated circular spline relative to a fabricated flexspline. Although the circular spline is not depicted as including gear teeth, gear teeth can subsequently be machined into the circular spline.

The above-described fabrication techniques can be used to efficiently fabricate strain wave gears and strain wave gear components. For example, as alluded to above, expenses associated with machining the components can be avoided using these techniques. Accordingly, the cost for fabricating a given strain wave gear component becomes principally a function of the cost of the raw material, and this can be the case irrespective of the size of the component. By contrast, when steel-based strain wave gear components are formed, the cost of manufacturing the part may increase with a reduction in size beyond some critical value. This is because it becomes difficult to machine parts of a smaller size.

Figure 19:
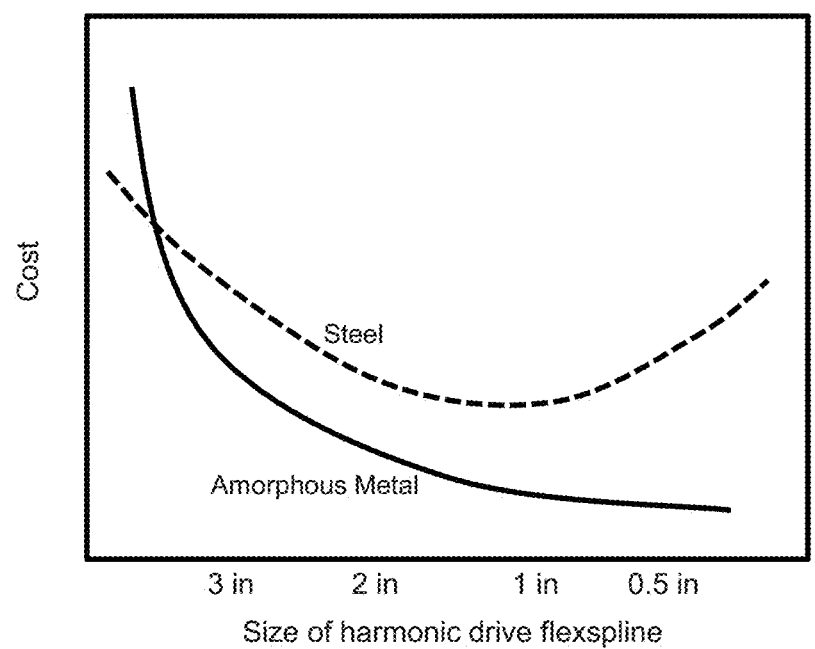
FIG. 19 illustrates the cost benefits of casting or thermoplastically forming strain wave gear components from MG-based materials in accordance with certain embodiments of the invention.
Figure 20:
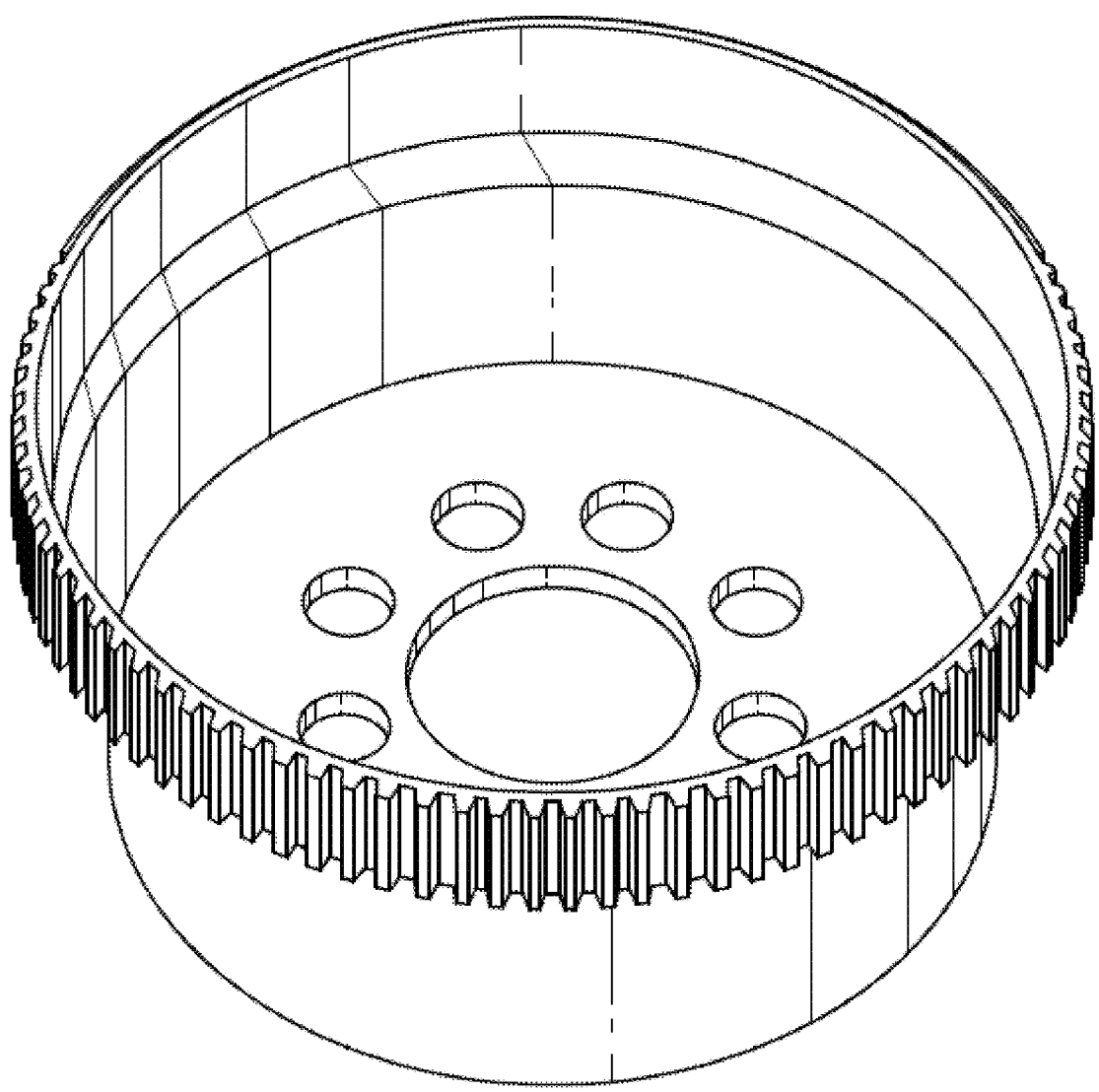
FIG. 20 illustrates a steel-based flexspline.

By way of example, FIG. 19 illustrates this relationship with respect to flexsplines where the cost of raw material for amorphous metal is greater than that of steel. For example, the stiffness of steel may require that flexsplines have a diameter less than some specified amount, e.g. 2 inches, and have a wall thickness of less than some amount, e.g. 1 mm. To provide context, FIG. 20 illustrates a steel-based flexspline 2" in diameter and having a wall thickness of 0.8 mm. Importantly, as flexsplines are made smaller, e.g. below 1 inch in diameter, the wall of the steel becomes too thin to machine easily. As a result, even where the cost of the amorphous metal raw material is greater than that of steel, the flexspline can be cheaper to manufacture from amorphous metal. In essence, burdensome machining could be eliminated by casting the part from a MG-based material, and the cost of the flexspline can thereby be reduced.

Customized Manufacturing Processes for the Fabrication of Tailored Metallic Glass-Based Materials As can be appreciated from the above discussion, the implementation of MG-based materials into strain wave gears and strain wave gearing components can confer a host of advantages. For example, as already alluded to above, the implementation of metallic glass-based materials can result in the creation of more robust strain wave gears and strain wave gearing components. Moreover, as also alluded to above, metallic glass-based materials are amenable to casting and other thermoplastic manufacturing strategies, which can be much more efficient manufacturing techniques relative to conventional techniques typically employed in constructing conventional steel-based strain wave gears (e.g. machining). In many embodiments of the invention, the information discussed above is used to implement unique manufacturing strategies to produce highly customized strain wave gears. For example, MG-based materials can be made to possess unique materials property profiles, and these materials profiles can influence design considerations.

For instance, in many embodiments, robust metallic glass-based strain wave gears having a relatively smaller dimension—e.g. having flexsplines characterized by a major diameter of less than approximately 4 inches—are implemented using MG-based materials. In a number of embodiments, robust metallic glass-based strain wave gears having flexsplines characterized by a major diameter of less than approximately 2 inches are implemented using MG-based materials. Conventionally, the manufacture of strain wave gears from steel at such small dimensions can be challenging. In particular, in order for steel to be made to achieve the requisite level of flexibility for suitable flexspline operation at such small dimensions, it generally has to be made in the form of a relatively thin walled structure. However, because the flexspline has to be made to conform to this thin shape, it can be undesirably fragile. By contrast, metallic glass-based materials can be relatively much thicker and still possess the requisite level of flexibility. This is because metallic glass-based materials can be made to be much less stiff than steel-based materials. Accordingly, the thicker flexsplines made from metallic glass-based materials can be much more durable. Moreover, it can be much easier to cast thicker metallic glass-based as opposed to thinner metallic glass-based materials.

Figure 21:
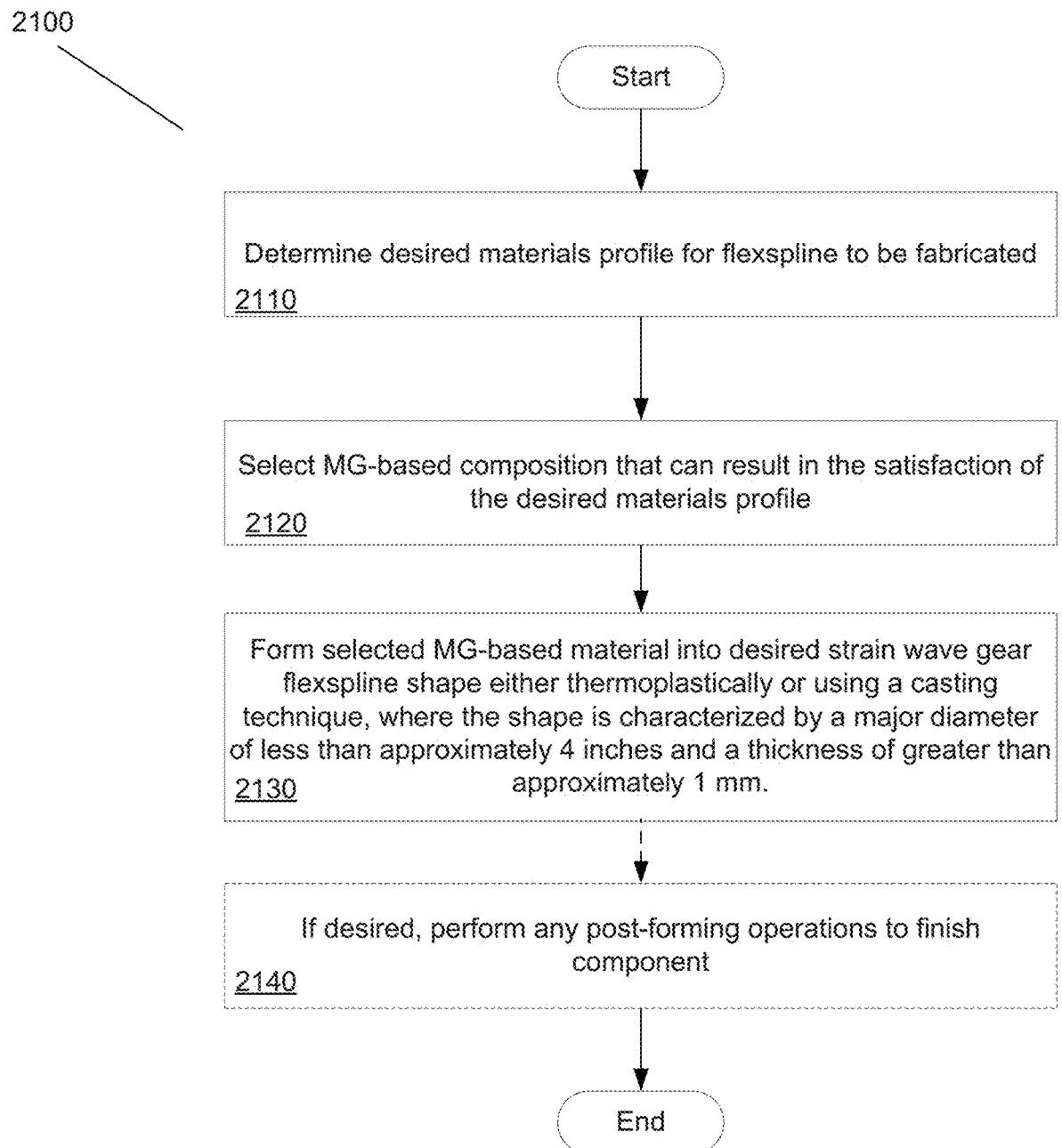
FIG. 21 illustrates forming a relatively smaller strain wave gear flexspline in accordance with certain embodiments of the invention.

FIG. 21 illustrates a process for fabricating a strain wave gear flexspline characterized by a maximum diameter of less than approximately 4 inches in accordance with certain embodiments of the invention. In particular, the process 2100 is similar to that described with respect to FIG. 6 insofar as it includes determining 2110 a desired materials profile and selecting 2120 a suitable MG-based composition from which the desired materials profile can be realized. Within the context of the instant application, the term "MG-based composition" can be understood to reference an element or aggregation of elements that are capable of forming a metallic glass-based material (e.g. via being exposed to a sufficient cooling rate). As before, the selection 2120 can account for any of a variety of alloy variations—in other words, a base composition can be alloyed as desired in order to converge on a suitable MG-based composition that can yield the desired result. The materials selection 2120 can also account for the application of any of a variety of processing methodologies on a given composition. For instance, a base composition can be heat treated during the forming process so as to develop desired crystalline phases within the context of a metallic glass composite. The method 2100 further includes forming 2130 the selected MG-based composition into the desired strain wave gear flexspline shape characterized by the desired materials properties, a thickness of greater than approximately 1 mm and a major diameter of less than approximately 4 inches. Of course, any suitable forming process can be implemented in accordance with embodiments of the invention that can allow for the realization of the MG-based material, including casting processes and thermoplastic forming processes. For instance, casting processes can be implemented that allow for sufficiently rapid cooling rates (e.g. 1000 K/s) so as to cause the formation of an amorphous matrix can be implemented. In many embodiments, the forming 2130 of the flexspline includes casting the selected MG-based material around a crystalline metal solid body. This technique is disclosed in U.S. patent application Ser. No. 14/971,848 ("the '848 app"), incorporated by reference above. This can be an effective casting strategy as the formed MG-based material can be easily removed from the crystalline metal solid body since the crystalline metal solid body will typically shrink upon the cooling of the cast material to a greater extent than the cast MG-based material (as disclosed in the '848 app). In several embodiments, thermoplastic forming techniques are implemented to form the composition into the desired shape. For example, any of the above-described thermoplastic forming techniques can be implemented. In a number of instances, localized thermoplastic forming processes are implemented. Localized thermoplastic forming processes are disclosed in U.S. patent application Ser. No. 14/252,585, and generally involve locally heating a metallic glass-based material within a first region to a temperature greater than the glass transition temperature of the metallic glass-based material, and deforming the metallic glass-based material within the first region while the temperature of the metallic glass-based material within the first region is greater than its respective glass transition temperature. As can be appreciated, this can be achieved in any of a variety of ways. The disclosure of U.S. patent application Ser. No. 14/252,585 is hereby incorporated by reference in its entirety, especially as it pertains to localized thermoplastic forming processes. More generally, any of a variety of forming processes can be implemented in accordance with embodiments of the invention.

Subsequent to forming processes, as before, any post-forming operations can be performed 2140. In many instances, the formed 2130 flexsplines are "net shape" and do not require any appreciable post-forming processing. In a number of embodiments, the formed 2130 flexsplines are 'near net shape' and require minimal post-forming processing to finish the part. For instance, surface finishes can be implemented. Any suitable post-forming processing can be implemented in accordance with embodiments of the invention, including any of the processes mentioned previously with respect to FIG. 6.

Figure 22A:
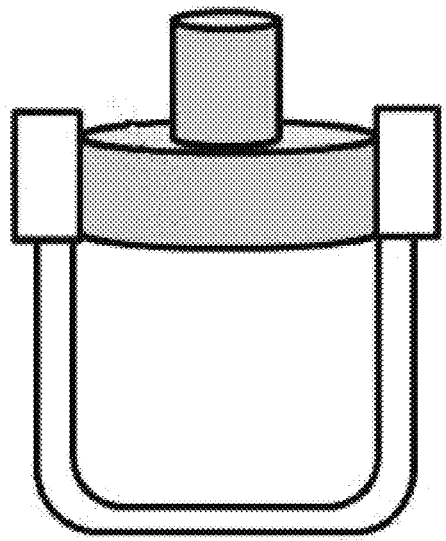
FIGS. 22A-22C illustrate flexsplines having relatively thicker walls in accordance with certain embodiments of the invention.
Figure 22B:
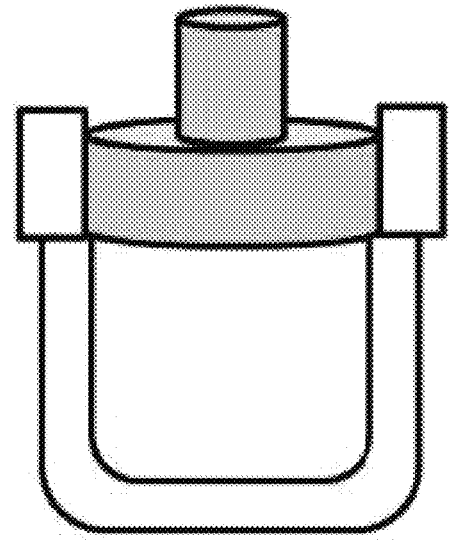
Figure 22C:
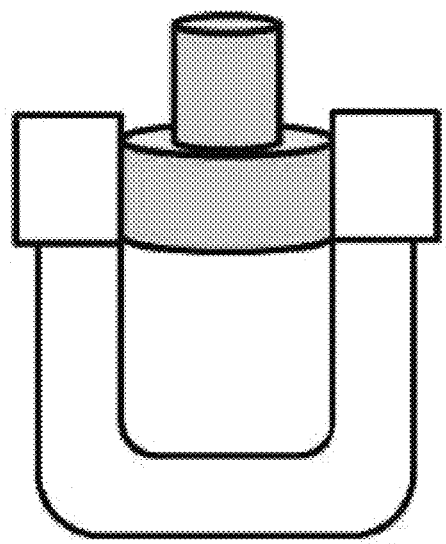

FIGS. 22A-22C illustrate strain wave gear flexsplines having various thicknesses for purposes of comparison. In particular, FIG. 22A illustrates the wave generator and a flexspline of a conventional steel-based strain wave gear flexspline, characteristically possessing a relatively thin wall. FIG. 22B illustrates the wave generator and the flexspline of a strain wave gear manufactured from metallic glass-based components. In particular, it is depicted that the cup-shaped flexspline has a thicker wall than that of the steel-based flexspline seen in FIG. 22A; however, the "toothed" portion of the flexspline is similar in geometry to that seen in FIG. 22A. Correspondingly, the wave generator also maintains a similar geometry. In this way, the flexspline can be relatively more robust compared to the geometry illustrated in FIG. 22A, but can still accommodate a pre-defined wave generator geometry. FIG. 22C illustrates that both the cup-portion of the flexspline and the toothed portion of the flexspline are made to be thicker from a MG-based material. In this instance, the wave generator would have to have a different geometry to accommodate the thicker toothed portion. The MG-based material can be sufficiently flexible that suitable strain wave gear operation can be maintained even with the thicker geometry. Whereas smaller strain wave gears constructed from steel had to utilize thin-walled structures (generally less than 1 mm) in order to realize the requisite flexibility, smaller strain wave gears constructed from MG-based materials can be much thicker. In this way, strain wave gears that are more structurally resilient can be produced using MG-based materials. Additionally, it can be much easier to cast metallic glass-based materials of greater thickness relative to casting thin walled MG-based structures.

Figure 23:
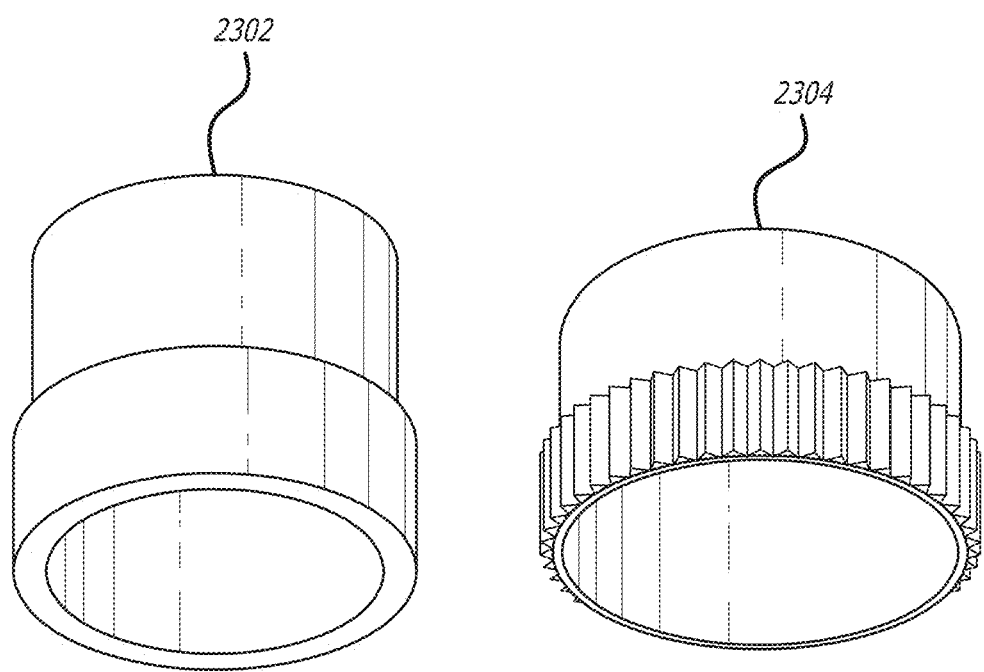
FIG. 23 illustrates a conventional steel-based flexspline relative to a thicker MG-based flexspline in accordance with an embodiment of the invention.

As an example, FIG. 23 depicts an isometric view of a thick-walled MG-based flexspline 2302 relative to an equivalent thin-walled steel-based flexspline 2304.

While FIG. 21 illustrates a generalized process for fabricating a flexspline, it should be clear that the depicted process can be applied and/or augmented in any of a variety of ways in accordance with many embodiments of the invention. For example, in many embodiments, the method further includes computing a maximum thickness that the flexspline can be made to possess and still viably operate under the desired operating conditions based on the inherent structural characteristics of the MG-based material to be implemented, and forming the flexspline into the desired shape wherein the formed flexspline is characterized by a thickness of less than the computed thickness. In many instances the computed wall thickness accounts for the resistance to fatigue failure. In many embodiments, the method is further characterized insofar as the maximum thickness of the formed flexspline is approximately 3 mm.

Figure 24A:
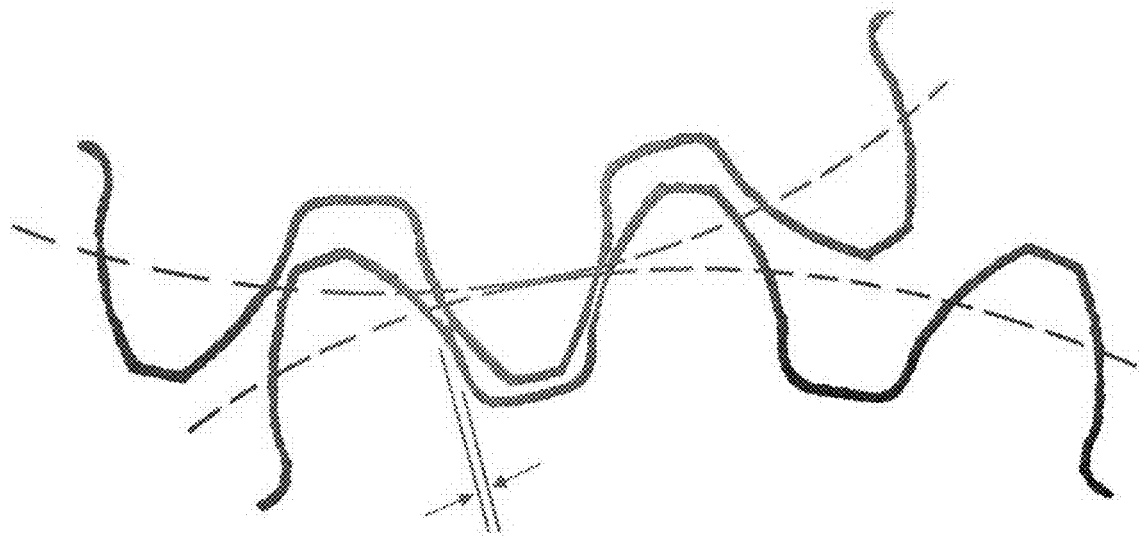
FIGS. 24A-24B illustrate S-shaped gear teeth that can be implemented in accordance with certain embodiments of the invention.
Figure 24B:
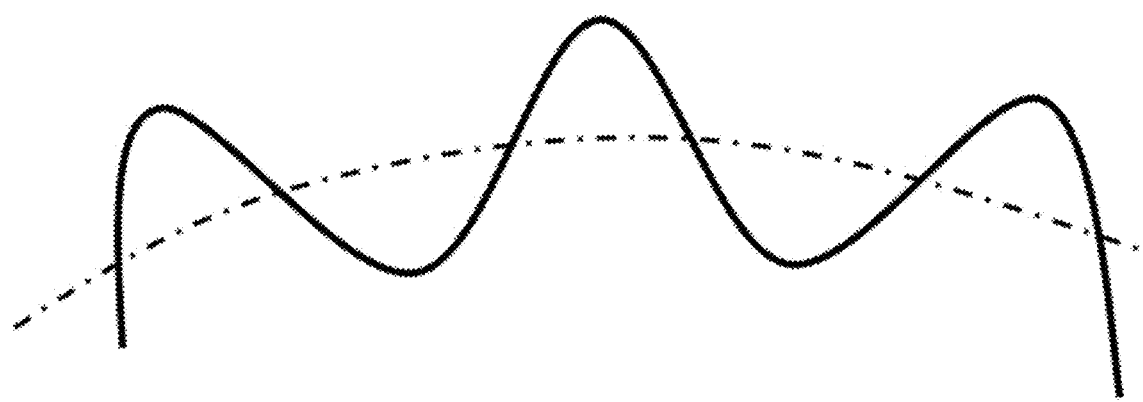

Notably, the ability to rely on casting and thermoplastic manufacturing techniques can greatly enhance the customizability of the manufacture of strain wave gears. For example, strain wave gearing components can be more readily cast in non-traditional shapes. Thus for example, in many embodiments of the invention, flexsplines and/or circular splines are cast so that they include "S-shaped" teeth. Conventional gear teeth geometries can result in excessive and unwanted contact known as backlash between intermeshing teeth. By contrast, gear teeth characterized by S-shaped geometries can allow for minimized backlash and therefore smoother operation. FIGS. 24A and 24B illustrate conventional gear teeth geometries relative to S-shaped gear teeth geometry. In particular, FIG. 24A illustrates conventional gear teeth geometry, and highlights the area where backlash can be impactful. FIG. 24B illustrates S-shaped gear teeth geometry that can be implemented via casting and/or other thermoplastic forming techniques in accordance with many embodiments of the invention. Of course, while the implantation of S-shaped teeth is discussed and illustrated, any suitable component shapes can be implemented in accordance with embodiments of the invention. Casting and thermoplastic processes are versatile and lend themselves the production of any of a variety of geometries.

While the above-discussion has regarded the implementation of MG-based materials by utilizing them as the bulk material within respective strain wave gear components, in many embodiments, MG-based materials are coated onto strain wave gears fabricated from more conventional materials (e.g. steel and/or plastics). In this way, the wear-resistant properties of any of a variety of MG-based materials can be harnessed.

As can be seen, the described manufacturing methods can enable the implementation of highly customized strain wave gears. They can be made to possess any of a variety of intrinsic materials properties based on the implemented metallic glass-based materials. And they can also readily be made to conform to unconventional, but advantageous, geometries. This level of customization is generally not feasible with conventional steel manufacturing methodologies.

As can be inferred from the above discussion, the above-mentioned concepts can be implemented in a variety of arrangements in accordance with embodiments of the invention. For example, in some embodiments, strain wave gear components are cast from polymeric materials, and subsequently coated with bulk metallic glass-based materials. In this way, the wear resistant properties of bulk metallic glass-based materials can be harnessed. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A method of fabricating a flexspline of a strain wave gear comprising:
   providing a mold of the flexspline;
   forming a MG-based composition into a flexspline using a forming technique comprising:
      depositing an MG-based composition into the mold;
      heating the MG-based composition to a temperature greater than the glass transition temperature of the MG-based composition,
      forming and compressing the MG-based composition within the mold while the temperature of the MG-based composition within a first region is greater than its respective glass transition temperature of the MG-based composition such that the MG-based composition conforms to the shape of the mold,
      quenching the MG-based composition sufficiently rapidly to maintain at least some amorphous structure in the MG-composition,
      removing the MG-based composition from the mold, and
   wherein the forming of the MG-based composition results in a formed flexspline comprising a MG-based material; and
   wherein the formed flexspline is characterized by: at least a portion having a thickness of greater than approximately 1 mm and a major diameter of less than approximately 4 inches.

2. The method of claim 1, wherein the mold is an outer mold defining the final shape of the flexspline, and wherein the MG-based composition is forcibly pressed against the mold.

3. The method of claim 2, wherein at least a wall of the flexspline is formed of the MG composite material and wherein at least a plurality of teeth is formed of the MG-composition.

4. The method of claim 1, wherein the formed MG-based material has an entirely amorphous structure.

5. The method of claim 1, wherein the formed MG-based material is a metallic glass matrix composite.

6. The method of claim 1, wherein the formed MG-based material is further characterized by the inclusion of at least one set of gear teeth.

7. The method of claim 5, wherein the gear teeth have a non-linear too profile.

8. The method of claim 1, wherein the MG-based composition is a Titanium-based MG-based composition.

9. The method of claim 1, wherein the selected MG-based composition is a composite material that includes at least one of one of V, Nb, Ta, Mo, and Sn.

10. The method of claim 1, wherein the formation of the flexspline is a net shape process.

11. The method of claim 10, wherein the flexspline comprises plurality of gear teeth formed to a near-net shape, and further comprising finishing the plurality of gear teeth to form the plurality of gear teeth into a net shape.

12. The method of claim 1, wherein the formed flexspline has a wall characterized by a maximum thickness of less than approximately 3 mm.

13. The method of claim 1, wherein the heating technique is one of: a capacitive discharge forming technique and a frictional heating technique.

14. The method of claim 1, wherein the forming technique is one of: spin forming, blow molding, and centrifugal casting.

15. The method of claim 1, wherein the MG-composition is powderized and then fused during the heating, deforming and compressing to form the flexspline.

16. The method of claim 1, further comprising finishing the MG-material.

17. The method of claim 1, wherein the flexspline comprises at least one groove configured to contain at least one spherical body.

18. The method of claim 1, wherein the MG-composition is initially provided as a feedstock formed as one or more sheets, wherein the sheet is at least partially amorphous and has sufficient volume to form the flexspline after forming.

19. The method of claim 18, wherein more than one sheet is used to form the flexspline, and wherein the MG-composition forming each sheet has insufficient glass forming ability to form a single sheet of sufficient thickness to form the flexspliine.

20. The method of claim 19, wherein the more than one sheet collectively has sufficient thickness to form the flexspline.

21. The method of claim 19, wherein the flexspline is formed of a plurality of materials at least one of which is the MG-composition and at least one of which is a MG composite material.

22. The method of claim 18, wherein the sheet has a thickness of less than 1 mm.

23. A method of fabricating a flexspline of a strain wave gear comprising:
providing a mold of the flexspline;
forming a MG-based composition using a forming technique comprising:
heating the MG-based composition to a temperature greater than the glass transition temperature of the MG-based composition to form a molten MG-based composition,
depositing the molten MG-based composition into the mold;
quenching the MG-based composition sufficiently rapidly to maintain at least some amorphous structure in the MG-composition,
removing the MG-based composition from the mold as a molded MG-based part,
reheating at least a first region of the MG-based part to a temperature greater than the glass transition temperature of the MG-based composition,
wherein at least some portion of the MG-based part, that is continuous through the thickness of the MG-based part, is not heated above its respective glass transition temperature when the first region is heated to a temperature greater than the glass transition temperature,
forming the MG-based part within the first region while the temperature of the MG-based part within the first region is greater than its respective glass transition temperature, and
wherein the forming of the MG-based composition results in a formed flexspline comprising a MG-based material; and
wherein the formed flexspline is characterized by: at least a portion having a thickness of greater than approximately 1 mm and a major diameter of less than approximately 4 inches.

24. The method of claim 23, wherein the formed MG-based material has an entirely amorphous structure.

25. The method of claim 23, wherein the formed MG-based material is a metallic glass matrix composite.

26. The method of claim 23, wherein the formed MG-based material is further characterized by the inclusion of gear teeth.

27. The method of claim 23, wherein the MG-based composition is a Titanium-based MG-based composition that includes at least one of one of V, Nb, Ta, Mo, and Sn.

28. The method of claim 23, wherein the heating technique is one of: a capacitive discharge forming technique and a frictional heating technique; and wherein the deforming technique is one of: spin forming, blow molding, and centrifugal casting.

* * * * *